US007878902B2

(12) United States Patent  
Mattice et al.

(10) Patent No.: US 7,878,902 B2
(45) Date of Patent: Feb. 1, 2011

(54) SECURED VERIFICATION OF CONFIGURATION DATA FOR FIELD PROGRAMMABLE GATE ARRAY DEVICES

(75) Inventors: Harold E. Mattice, Gardnerville, NV (US); Richard Wilder, Sparks, NV (US); Chauncey W. Griswold, Reno, NV (US)

(73) Assignee: IGT, Reno, NV (US)

( * ) Notice: Subject to any disclaimer, the term of this patent is extended or adjusted under 35 U.S.C. 154(b) by 1508 days.

(21) Appl. No.: 10/621,873

(22) Filed: Jul. 16, 2003

(65) Prior Publication Data
US 2005/0014559 A1 Jan. 20, 2005

(51) Int. Cl.
*A63F 9/24* (2006.01)
(52) U.S. Cl. ........................................................ 463/29
(58) Field of Classification Search .................... 463/29
See application file for complete search history.

(56) References Cited

U.S. PATENT DOCUMENTS

| 4,812,675 | A |   | 3/1989  | Goetting ......................... 326/8   |
|-----------|---|---|---------|-------------------------------------------|
| 5,237,652 | A |   | 8/1993  | McManus .................... 345/839       |
| 5,640,107 | A |   | 6/1997  | Kruse ............................ 326/38  |
| 5,643,086 | A | * | 7/1997  | Alcorn et al. .................. 463/29    |
| 5,768,288 | A |   | 6/1998  | Jones ......................... 714/725    |
| 5,805,794 | A |   | 9/1998  | Jones et al. .................... 714/37   |
| 5,841,867 | A |   | 11/1998 | Jacobson et al. ............. 713/187      |
| 5,996,091 | A |   | 11/1999 | Jones et al. .................... 714/37   |
| 6,011,407 | A |   | 1/2000  | New .............................. 326/39  |
| 6,118,869 | A |   | 9/2000  | Kelem et al. .................. 380/44     |
| 6,149,522 | A | * | 11/2000 | Alcorn et al. .................. 463/29    |
| 6,251,014 | B1|   | 6/2001  | Stockdale et al. ............. 463/16      |
| 6,260,172 | B1|   | 7/2001  | Hazama                                    |

(Continued)

FOREIGN PATENT DOCUMENTS

GB          2404757        2/2005

(Continued)

OTHER PUBLICATIONS

UK Patent Office Combined Search and Examination Report of Dec. 7, 2004 for Application No. GB0415710.3.

(Continued)

*Primary Examiner*—Peter DungBa Vo
*Assistant Examiner*—Omkar Deodhar
(74) *Attorney, Agent, or Firm*—Weaver Austin Villeneuve & Sampson LLP

(57) ABSTRACT

A method and apparatus for providing automated and secured verification of configuration data for a volatile prograntable electronic device, such as an FPGA, is disclosed. A configurator including at least one memory unit, such as a ROM or EEPROM, contains a configuration file, which file is transferred to the volatile programmable electronic device or FPGA on demand. Data from the configuration file is compared with data from a separate custodial file, which custodial file is substantially identical to the configuration file and resides in a location separate from the memory unit or units that store the actual configuration file. In some instances the comparison is made before any actual loading of the configuration file into the FPGA occurs, whereby loading is prohibited if no match is confirmed, while in other instances the FPGA is configured using the configuration file and is then shut down if no match is later confirmed.

25 Claims, 12 Drawing Sheets

U.S. PATENT DOCUMENTS

| | | | |
|---|---|---|---|
| 6,279,146 B1 | 8/2001 | Evans et al. | 716/18 |
| 6,314,539 B1 | 11/2001 | Jacobson et al. | 714/727 |
| 6,351,814 B1 | 2/2002 | Batinic et al. | 713/194 |
| 6,414,871 B1 | 7/2002 | Wirtz, II et al. | 365/185.01 |
| 6,425,101 B1 | 7/2002 | Garreau | 714/727 |
| 6,488,581 B1 | 12/2002 | Stockdale | 463/29 |
| 6,507,213 B1 | 1/2003 | Dangat | 326/38 |
| 6,595,856 B1 * | 7/2003 | Ginsburg et al. | 463/29 |
| 6,722,986 B1 * | 4/2004 | Lyons et al. | 463/29 |
| 7,108,605 B2 * | 9/2006 | LeMay et al. | 463/43 |

FOREIGN PATENT DOCUMENTS

| | | | |
|---|---|---|---|
| JP | 10052548 A | 2/1998 |
| JP | 10052549 A | 2/1998 |
| WO | WO01/24012 A1 | 4/2001 |
| WO | WO01/77837 A1 | 10/2001 |
| WO | WO03/013677 A1 | 2/2003 |

OTHER PUBLICATIONS

Examination Report Under Section 18(3) dated Feb. 2, 2006 from GB Application No. 0415710.3.

Examiner's First Report dated Aug. 12, 2009 on Patent Application No. 200403230.

Examination Report dated Oct. 18, 2005 from Application No. GB0415710.3.

* cited by examiner

SECURED VERIFICATION OF CONFIGURATION DATA FOR FIELD PROGRAMMABLE GATE ARRAY DEVICES

TECHNICAL FIELD

The present invention relates generally to a method and apparatus for providing security in an electronic device, and more specifically to a method and apparatus for authenticating operations of a microprocessor based gaming machine.

BACKGROUND

Technological advances in the field of electronics and computers tend to precede many needed and desirable security and authentication systems, and it is well known that hackers, thieves and cheats sometimes defeat even the most well designed and secured devices, machines and networks. In light of the various concerns related to using such items, many entities, both public and private, have various requirements for security on their electronic machines, systems and networks. One example of an electronic device or machine requiring heightened security and authorization capabilities is a gaming machine (i.e., slot machine or other gambling device).

Because gaming machines frequently utilize a variety of security features, techniques and systems, gaming machines in particular comprise an ideal illustrative example for the types of electronic security and authentication systems disclosed and discussed herein. Thus, although the following discussion and illustrative examples are directed primarily to electronic security and authentication systems in gaming machines as a matter of convenience, it should be borne in mind that such electronic security and authentication systems are readily applicable to other types of electronic devices and systems as well.

Over the past few decades, the casino and gaming industries have experienced a marked shift from the use of fully mechanical gaming machines to electronic and microprocessor based gaming machines. Such microprocessor based gaming machines include both hardware and software components to provide a wide variety of game types and game playing capabilities, with such hardware and software components being generally well known in the art. Hardware components can include, for example, a cathode ray tube (CRT) or other video display for displaying game play, one or more speakers for providing audio output, one or more mechanical buttons, switches, levers or microphones for enabling various player inputs, assorted coin acceptors and detectors, and various electronic components typically found in a microprocessor based system, such as a central processing unit (CPU), programmable logic devices, converters, memory modules, busses and the like. Software components can include, for example, boot and initialization routines, various game play programs and subroutines, credit and payout routines, image and audio generation programs, and a random number generator, among others.

Because casinos and other forms of gaming comprise a growing multi-billion dollar industry wherein large sums of money can quickly change hands during many types of fast paced games, casinos and other gaming establishments are a prime target for thieves, cheats and a variety of assorted cons. Gaming machines, and microprocessor based gaming machines in particular, comprise a particularly favorite target for such activities, due in part to their relatively isolated nature and increasing technological complexity and sophistication. While increases and advances in technological complexity and sophistication are generally welcome, in that such advances can provide more interesting and exciting types of game play and ways to win, such advances also usually provide a new variety of ways for nefarious or unscrupulous individuals to steal from, cheat, or otherwise defraud a gaming machine. One such way to cheat or defraud a gaming machine is to introduce unauthorized or otherwise unsecured data or machine code into the gaming machine in a manner so as to trick or defeat the programming or electronics of the machine, and such techniques have been the modus operandi of many hackers and cheats.

In early designs of electronic gaming machines, the addressing of memory locations containing information and/or programs that determine the outcome of games played on such machines was accomplished by simply using discrete logic gates. Similar discrete logic gates were likewise used in the coin in and coin out logic in such gaming machines, whereby AND, OR, NAND, NOR and INVERTER gates were wired together using simple printed circuit board technology to form decoders, bus steering, addressing, decoding, logic blocks and the like. Unfortunately, however, such simple printed circuit boards could be easily modified to change the connections of these elements surreptitiously. Such modifications were readily accomplished by cutting various printed circuit board traces and then soldering jump wires to the cut traces and the discrete logic gates. This "cut and jump" technique could then be used, for example, to create different game results by altering the decoders to point to a different memory location where other code was stored, which code could be legitimate or, more often than not, imposed from a hacker. Another "cut and jump" example of defrauding a gaming machine would be to use this technique to prevent a "coin in/coin out" logic block from communicating errors to the gaming machine whenever any number of cheating tools or techniques were used to defraud or cheat the machine at a location controlled by that logic block.

Although the foregoing examples are just a few of the possibilities that could be achieved with a cut and jump or similar nefarious technique, such techniques were easily recognized, as this type of modification resulted in the obvious cutting of the printed circuit board and visible implementation of jump wires. As will be readily understood, such cut and jump and other similar cheat or hack techniques are not limited to the electronics of gaming machines, and such techniques could be similarly used in a wide variety of microprocessor based devices and machines as well. In response to such practices in gaming machines, many gaming and regulatory bodies amended their various regulations accordingly to require the use of at least one Simple Programmable Logic Device (SPLD) and/or at least one Complex Programmable Logic Device (CPLD) within the controlling circuitry of new microprocessor based gaming machines. As is generally known in the art, such SPLDs and CPLDs are essentially chips that comprise a plurality of internal logic gates with internal programmable interconnections, such that cutting and jumping techniques are rendered significantly more difficult, or even impossible. These and other similar solutions have also been utilized in electronic devices and machines outside the gaming machine context and the gaming industry in general.

SPLDs and CPLDs are typically programmed at the factory with a code that causes the various interconnections to form the various elements, such as, for example, decoders, bus steering, addressing, decoding, logic blocks and the like, that are required to operate the gaming machine correctly. In this factory programming process, bits are sometimes set so that future programming cannot take place, with such set devices being commonly known as One Time Programmable (OTP) devices. Additional security features also usually exist in this type of hardware, such as one or more protection features that keep the information inside the device from being read, which feature or features makes it difficult to reverse engineer such devices or parts. These and other various methods and apparatuses for providing security and/or electronic authentication in a gaming machine are generally known, and instances of such apparatuses and methods can be found in, for example, U.S. Pat. No. 6,149,522 to Alcorn, et al., U.S. Pat. No. 6,251,014 to Stockdale, et al., and U.S. Pat. No. 6,488,581 to Stockdale, all of which are incorporated herein by reference in their entirety and for all purposes. Other related systems, apparatuses and methods for programming and/or providing security in programmable devices generally are also known, and descriptions of such related systems, apparatuses and methods can be found, for example, in U.S. Pat. Nos. 4,812,675; 5,237,652; 5,640,107; 5,768,288; 5,805,794; 5,835,503; 5,841,867; 5,996,091; 6,011,407; 6,118,869; 6,279,146; 6,314,539; 6,351,814; 6,414,871; 6,425,101; 6,488,581; and 6,507,213, all of which are also incorporated herein by reference in their entirety and for all purposes.

Because cutting and jumping techniques are not the only ways whereby a gaming machine (or other electronic device) can be electronically defrauded, gaming industry regulations and laws have also historically forbidden the use of "writable" memory devices for the storage of computer codes that control various significant aspects associated with a gaming machine, such as payouts. It is readily apparent that such computer codes are critical, in that any manipulation or corruption of such codes or files, either accidentally or deliberately, can result in the defrauding of the gaming machine or the cheating or shortchanging of players. Because of such regulations, and because code or file manipulation or corruption poses such a significant threat to the integrity of a gaming machine, storage of most or all gaming machine codes is typically handled by less volatile (i.e., non-writable) types of memory, such as those found in standard Read Only Memory (ROM) or some types of Electrical Erasable Programmable Read Only Memory (EEPROM) devices.

In recent years, technological advances and the demands for more sophisticated gaming machines have resulted in devices of even greater complexity being designed into gaming machines in place of the relatively smaller SPLD, CPLD and other similar devices. Such devices include a variety of different large volatile programmable electronic devices, which can include, for example, a Field Programmable Gate Array (FPGA). An FPGA, or a similarly large volatile programmable electronic device, is generally a substantially larger and more complicated device that can handle not only many or all of the various interconnections and codes required for all of the various machine elements, but is also large enough to function as many or all of the actual decoders, bus steering, addressing, decoding, logic blocks and the like required within the gaming machine as well. As the name implies, an FPGA is programmed in the field, with a smaller electronic device attached to the FPGA typically being read to program or otherwise configure the FPGA every time the machine powers up. Such a reprogramming or reconfiguring of a gaming machine FPGA upon each power up is in accordance with various gaming regulations that require the full erasing or "dumbing down" of data within an FPGA or similarly large volatile programmable component within a gaming machine at every machine power off or shut down. The configuring data or information inside this smaller electronic device being read, which is typically an EEPROM or comparable ROM unit, is then used to configure and program the FPGA and its internal memory upon each boot or power up.

One problem associated with a large and comprehensive volatile programmable device such as an FPGA, however, is that such devices contain a sufficient amount of internal memory and data that can be used to hack other programs or provide a hack code itself. The resulting ability of this device to potentially alter the outcome of a game played on a gaming machine hence places it in a category of devices that must have the highest level of security. Unlike the obvious instances of cutting and jumping, however, if the configuration information or data read into an FPGA or similar device has a hacked code, algorithm or data in it, inspectors and regulators may never be able to detect that hacking has occurred. This is especially troublesome where third parties have access to a configurator, such as an EEPROM, ROM or other configuring memory component, before or during installation into the gaming machine, or where third parties who are familiar with the type of configuring memory components in a gaming machine are able to attempt a "cut and jump" from an intended configuring memory component to a similar but differently programmed hack memory component.

Accordingly, there exists a need for improved methods and apparatuses to provide security within an electronic device or machine, and in particular for such improved methods and apparatuses to provide ways of securely authenticating configuration data for a volatile programmable electronic device, such as an FPGA, within a gaming machine.

In addition, under the laws and regulations of many gaming jurisdictions, strict security and authentication must be provided for various software components of an electronic gaming machine or system. Such components must typically be stored in unalterable memory, which can be an unalterable ROM or EEPROM. At least one copy of the contents of such a critical ROM or EEPROM, or a message digest of such contents, as such an item is known to those skilled in the art, must typically be kept on file in a secure location as designated by a gaming authority. The actual contents or a message digest of the contents of any particular EEPROM or ROM removed from a gaming machine can then be verified against such a custodial version, if necessary, via a device such as an EEPROM Comparator, with such devices and the use of same being well known in the art.

Such an instance can occur, for example, when a patron has hit a jackpot on a gaming machine, whereby a critical EEPROM or ROM is then physically removed from its socket within that gaming machine, and a copy or message digest of the EEPROM or ROM contents is computed directly from the EEPROM or ROM and compared with the copy or message digest on file at the designated custodial location. If the two copies or message digests match, then the contents of the EEPROM or ROM are considered to be authenticated and a payout can be made to the player.

Such a procedure can tend to be time-consuming and stressful, however, as authorities need to be called in, the affected gaming machine must be taken apart, the appropriate chip or chips must removed, the appropriate custodial authenticating version or versions must be found, and all chips must then be placed on a special testing board and tested for authenticity. In addition, items such as FPGAs, ROMs, EEPROMs and the like are static sensitive devices that can be damaged or have internal data corrupted if not handled properly, rendering the physical removal of such components for testing and/or reprogramming purposes a less than ideal circumstance. Furthermore, continued removal and replacement of such items introduces wear and tear to various contacting components, whereby parts are eventually worn out even where one or more individual pins or contacts are not significantly damaged in certain cases of removal and reinsertion.

Accordingly, there also exists a need for improved methods and apparatuses to provide faster yet wholly reliable authentication or reprogramming of critical electronic components within a gaming machine on demand, without the need for removing such electronic components from the machine or their sockets.

SUMMARY

It is an advantage of the present invention to provide a method and apparatus for securely verifying data for volatile programmable electronic devices, such as an FPGA. It is another advantage of the present invention to provide a method and apparatus that results in the faster and more streamlined authentication of any critical memory components within an electronic machine on demand, whereby such critical memory components do not need to be removed from the entire machine.

According to one embodiment of the present invention, the provided method and apparatus involve the secured authentication of boot up configuration data for a volatile programmable electronic device within or about an electronic or microprocessor based machine. This is accomplished by providing at least a CPU, a volatile programmable electronic device, a configurator containing a configuration file, a separate memory device containing a custodial file, and a comparator, all within or about the electronic or microprocessor based machine. The separate memory device containing the custodial file has a secondary secured location that is separate from the configurator, and at least a substantial portion of the custodial file is identical to at least a substantial portion of the configuration file.

At a boot or start up stage, the configuration file is transferred from the configurator to the volatile programmable electronic device, whereupon this device is then configured with the transferred configuration file. Before, during, or after this process, which time is not critical to the present invention, the comparator receives and compares at least a representative portion of data from the configuration file with at least a representative portion of data from the custodial file, whereupon a signal is sent as to whether the data in the configuration file is acceptable or not. If the configuration file is deemed acceptable, then a full data boot from the configurator to the volatile programmable electronic device is authorized or permitted, and machine operations proceed normally. If the configuration file is not deemed acceptable, then the device is held in reset and machine operations are stopped. In the event that an unacceptable configuration file has already been booted into the volatile programmable electronic device, then appropriate steps must be taken to stop any further activity of the device and to hold it in reset.

In a preferred embodiment, the electronic machine is a gaming machine, while the volatile programmable electronic device is an FPGA and the configurator is an EEPROM. In a particularly preferred embodiment the CPU acts as or contains the comparator and holds the FPGA in reset until the configuration file from the configurating EEPROM is authenticated, whereupon the file is then actually booted into the FPGA. The custodial file is located in a secondary secured location that can be in any of a number of places within or outside of the gaming machine. Such places can include, for example, atop or adjacent to the configurating EEPROM, at a separate isolated location within the machine, within one of a number of machine electronic components or memory devices, such as operational or game EEPROMs, and somewhere on an outside network location that can be communicated to the gaming machine on demand. In a particularly preferred embodiment, the custodial file is located within the actual CPU itself.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive FPGA security and data authentication method and apparatus. These drawings in no way limit any changes in form and detail that may be made to the invention by one skilled in the art without departing from the spirit and scope of the invention.

DETAILED DESCRIPTION

Figure 1:
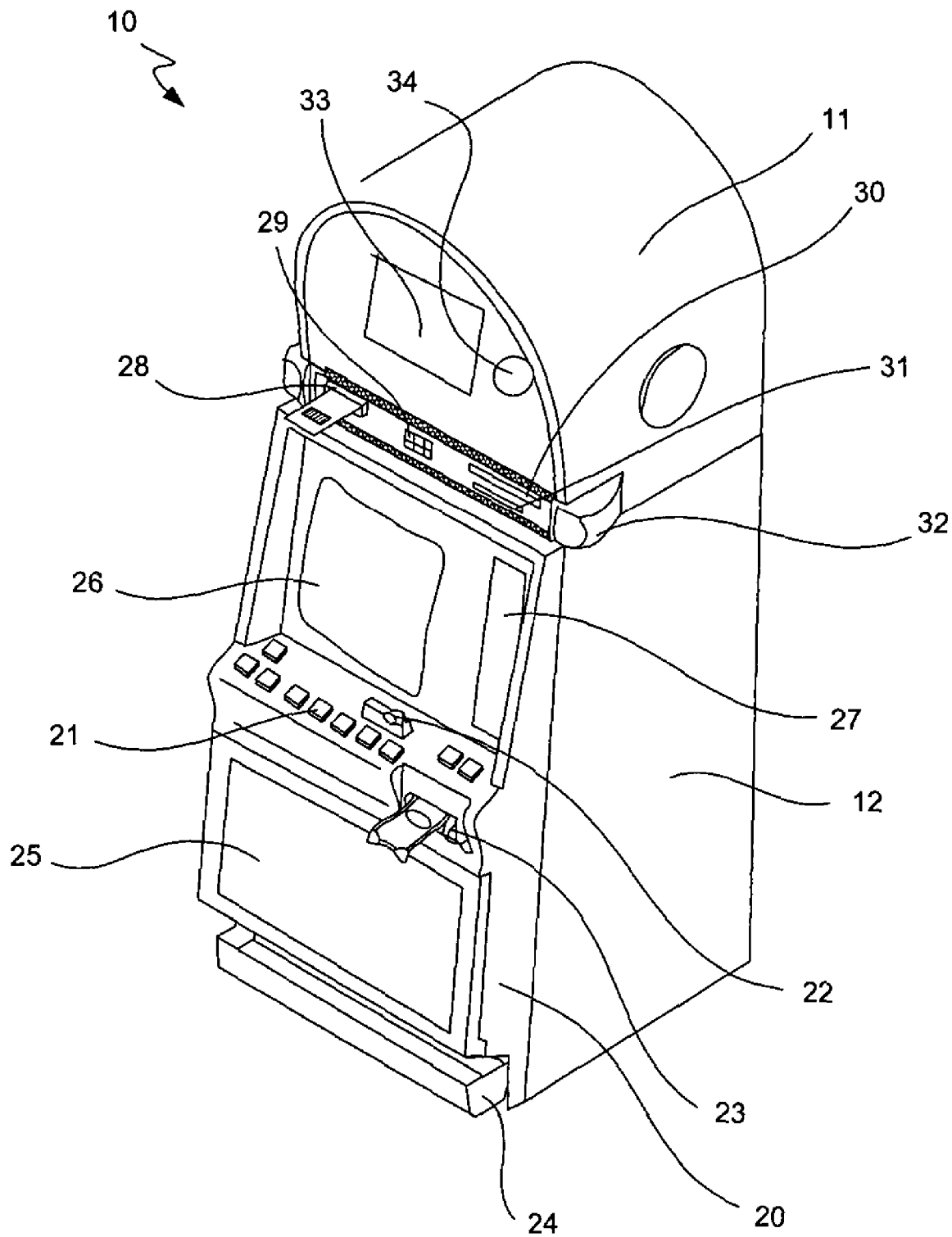
FIG. 1 illustrates in perspective view an exemplary gaming machine.

An example application of a method and apparatus according to the present invention is described in this section. This example is being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

One advantage of the present invention is that the boot up configuration data for volatile programmable electronic devices, such as FPGAs, within an electronic device or microprocessor based machine, such as a gaming machine, is provided in a secured and authenticated manner. This is accomplished by providing at least a CPU, a volatile programmable electronic device, a configurator containing a configuration file, a separate memory device containing a custodial file and a comparator, all within or about the microprocessor based machine. In particular, the comparator essentially compares the configuration file with the custodial file before machine operations are permitted to proceed normally. The ability of the volatile programmable electronic device to actually receive the configuration file before authentication is determined is left up to the designer or user of the machine, but it is at least preferable that normal machine operations do not take place at all or for long if the configuration file is indeed not authenticated by the comparator. In a particularly preferred embodiment, the comparator and custodial file both reside somewhere within the CPU itself.

Another advantage of the present invention is that the on-demand authentication of a critical electronic component, such as an EEPROM, within an electronic device or microprocessor based machine is done faster and in a more streamlined manner. This advantage is accomplished in a manner similar to that which accomplishes the foregoing advantage, in that a custodial version of EEPROM or ROM contents can similarly reside in a separate stored location within the electronic device, such as on the CPU. As a result, the appropriate EEPROM or ROM to be authenticated does not actually need to be removed from the electronic device or microprocessor based machine to be verified against the custodial version, and the functions and advantages of devices such as an EEPROM Comparator can be performed and realized internally within the electronic device or microprocessor based machine itself.

As discussed previously, while the inventive electronic security and authentication method and apparatus disclosed herein is being described primarily with references to and illustrations of gaming machines, this method and apparatus is readily adaptable for use in other types of machines and devices, such that its use is not restricted exclusively to gaming machines or within a gaming establishment. Similarly, while the inventive method and apparatus disclosed herein is being described primarily with references to and illustrations of FPGAs, this method and apparatus is readily adaptable for use with other types of volatile programmable electronic devices, such that use of the inventive method and apparatus is not restricted exclusively to FPGAs.

Continuing now with the illustrative example of an electronic security and authentication method and apparatus within a gaming machine utilizing an FPGA, and turning first to FIG. 1, an exemplary gaming machine is illustrated in perspective view. Gaming machine 10 includes a top box 11 and a main cabinet 12, which generally surrounds the machine interior (not shown) and is viewable by users. Main cabinet 12 includes a main door 20 on the front of the machine, which opens to provide access to the interior of the machine. Attached to the main door are typically one or more player-input switches or buttons 21, one or more money or credit acceptors, such as a coin acceptor 22, and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional electronically controlled video monitor. Main cabinet 12 also typically includes one or more access panels (not shown) in the back of the machine.

Top box 11, which typically rests atop of the main cabinet 12, may also contain a bill or ticket validator 28, a key pad 29, one or more additional displays 30, a card reader 31, one or more speakers 32, and a secondary video display monitor 33, which may also be a CRT, high resolution flat-panel LCD, plasma/LED display or other conventional electronically controlled video monitor. Top box 11 may also include one or more cameras 34 installed specifically for security reasons or other purposes, such as to generate player images that are integrated into a virtual gaming environment implemented on the gaming machine. While various items have been illustrated and described as being located with respect to top box 11, main cabinet 12 and main door 20, it will be readily understood and appreciated that all such items can be alternatively located elsewhere on the machine without departing from the spirit and scope of the present invention.

Figure 2:
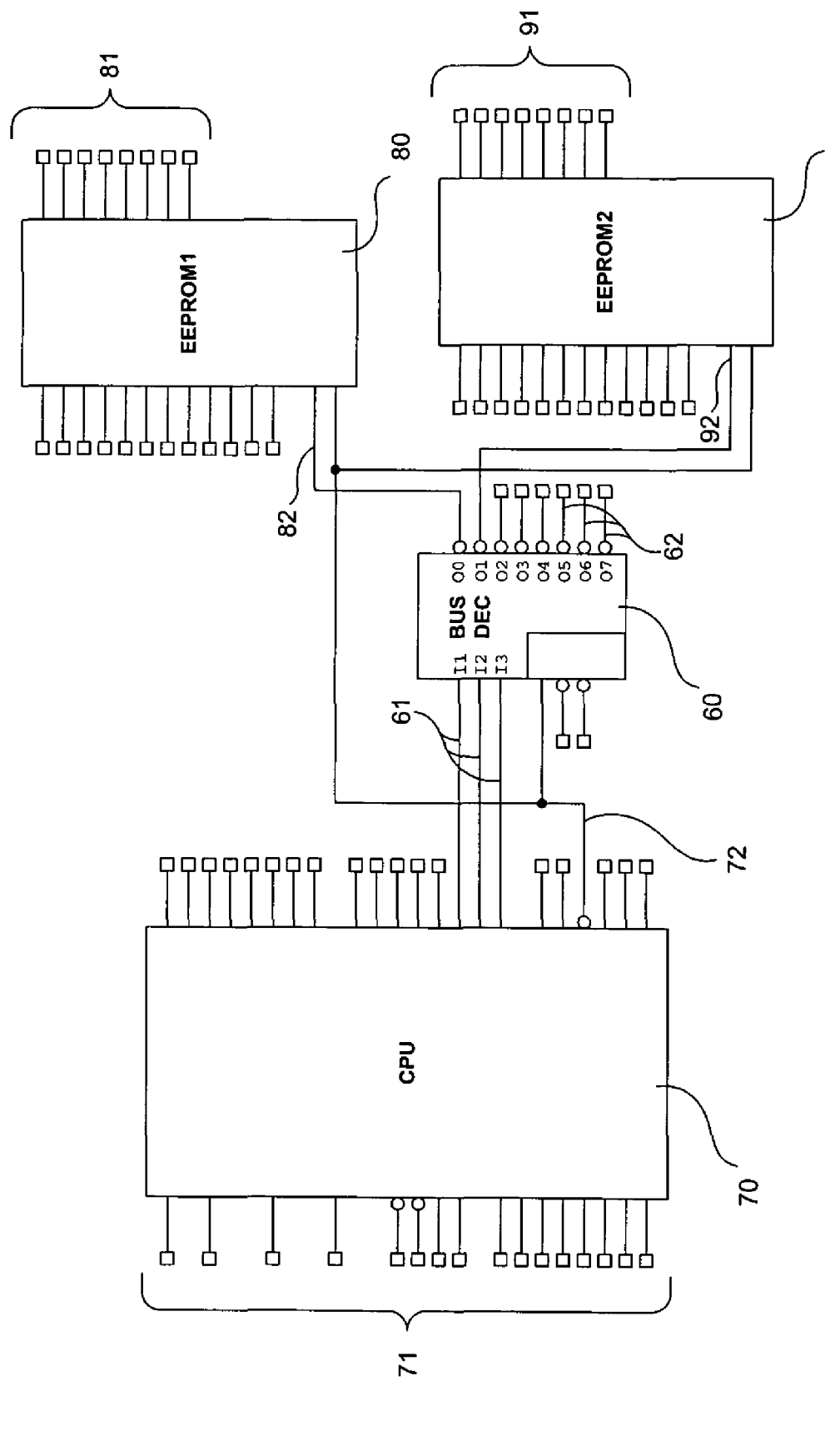
FIG. 2 illustrates a block diagram of a particular electronic infrastructure utilizing a bus decoder for providing gaming activities within a microprocessor based gaming machine.

Turning now to FIG. 2, a block diagram of a particular electronic infrastructure utilizing a bus decoder for providing gaming activities within a microprocessor based gaming machine is illustrated. Electronic infrastructure 50 comprises a number of components for providing gaming activities within a gaming machine. A common bus decoder 60 facilitates communication between CPU 70 and at least two EEPROMs 80, 90 containing code for various game functions. Bus decoder 60 can comprise, for example, a three to eight decoder chip comprising a plurality of in and out pins, such as a model 74C138 decoder chip. In this particular example, bus decoder 60 decodes three different input lines 61 into eight different output lines 62, although other amounts of input and output pins and lines are possible with different decoder chips, which different chips are also contemplated.

CPU 70 comprises a plurality of different pins 71 on both sides, which pins are used for a wide variety of input and output functions, the specifics of which are well known in the art. EEPROM1 80 and EEPROM2 90 similarly comprise a plurality of different pins 81, 91 on both sides that are similarly used for a plurality of different input and output functions. Preferably, at least one particular pin from each of bus decoder 60, CPU 70, EEPROM1 80, and EEPROM2 90 connects to a common program state line 72, which line may also be connected to other system components that are not shown. In addition, EEPROM1 80, EEPROM2 90, and any other memory units or components that are to be communicated to CPU 70 through bus decoder 60 preferably comprise one or more outlet lines that connect to bus decoder output lines 62. For example, EEPROM1 80 comprises at least outlet line 82, while EEPROM2 90 comprises at least outlet line 92.

The exact location of such pins and lines as heretofore described is not critical, with those being described and illustrated in FIG. 2 representing just one possible configuration of many. As mentioned previously, however, such discrete logic gate arrangements using relatively simple bus decoder chips are particularly susceptible to "cut and jump" and other nefarious cheat techniques, such that it is preferable to utilize an SPLD, CPLD, FPGA, and/or one or more other similarly complex volatile programmable electronic devices.

Figure 3:
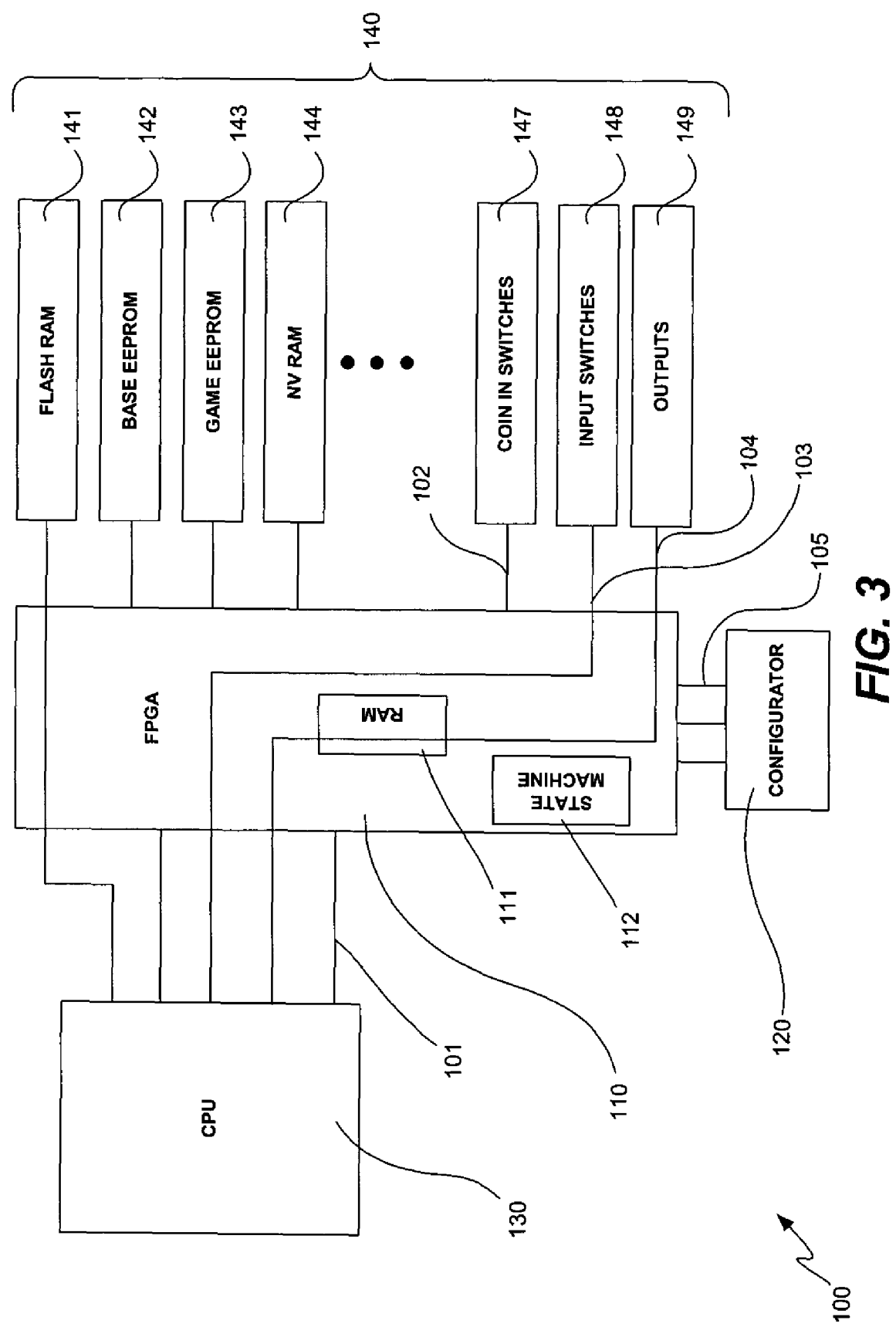
FIG. 3 illustrates a block diagram of one electronic infrastructure for utilizing an FPGA and configurator for providing gaming activities within a microprocessor based gaming machine.

Referring now to FIG. 3, a block diagram of one electronic infrastructure for utilizing an FPGA and configurator for providing gaming activities within a microprocessor based gaming machine is illustrated. Electronic infrastructure 100 comprises a number of electronic devices and components for providing gaming activities within a gaming machine. An FPGA or similar volatile programmable electronic device 110 is utilized in place of a common bus decoder and/or one or more other routing components and logic blocks. FPGA 110 can comprise, for example, a model XC3S50 FPGA manufactured by Xilinx, Inc. of San Jose, Calif. As will be readily understood by those skilled in the art, FPGA 110 comprises a number of internal components, such as, for example, one or more RAM units 111 and an internal state machine 112, among others. FPGA 110 also requires at least one configurator 120 that stores a configuration file for configuring and programming the FPGA when power is applied. In a preferred embodiment, configurator 120 comprises an EEPROM, unalterable ROM, or other similar memory device, with one particular example being any of the AT17LV series FPGA Configuration EEPROMs manufactured by Atmel Corporation of San Jose, Calif.

Once programmed, FPGA 110 facilitates communication between CPU 130 and a plurality of different electronic machine components 140. Such electronic components 140 can include, for example, various memory units such as a flash RAM 141, base EEPROM 142, game EEPROM 143, and non-volatile (NV) RAM 144, among others. Electronic components 140 can also include as many duplicate and other types of memory units as desired, as will be readily understood by those skilled in the art, as well as a variety of different switches and other various inputs and outputs. Such switches and other inputs and outputs are designated generically as coin in switches 147, other input switches 148, and outputs 149, with it being understood that any such type of hardware switch, input or output can be used, and that more than three different hardware connections can be made to FPGA 110.

Communications to, from and through FPGA 110 are preferably made via any number of simple direct FPGA connections, such as CPU to FPGA direct line 101 and coin in switch to FPGA direct line 102, whereby input or output to and from the FPGA is preferably routed and/or processed within the FPGA itself. Other communications types and modes are possible though, such as dedicated lines within the FPGA. One such example is dedicated input switch to CPU line 103, which provides a direct link, albeit through the FPGA, whereby the FPGA may monitor or utilize such a direct line 103. Another such example is a similar dedicated output to CPU line 104, which can be associated with one or more internal RAM units within or about the FPGA, with the FPGA being able to similarly monitor or utilize the information passing through direct line 104. In addition, preferably a plurality of direct lines 105 connects configurator 120 with FPGA 110, which lines may be combined to form a direct bus. Direct lines 105 preferably comprise at least one control bit line, one clock bit line and one data bit line, and it is particularly preferable that at least two control bit lines be included, with one dedicated control bit line being an interrupt-reset bit line and another being a separate dedicated control-chip enable out (CEO) bit line for indicating when data transfer is complete.

Figure 4:
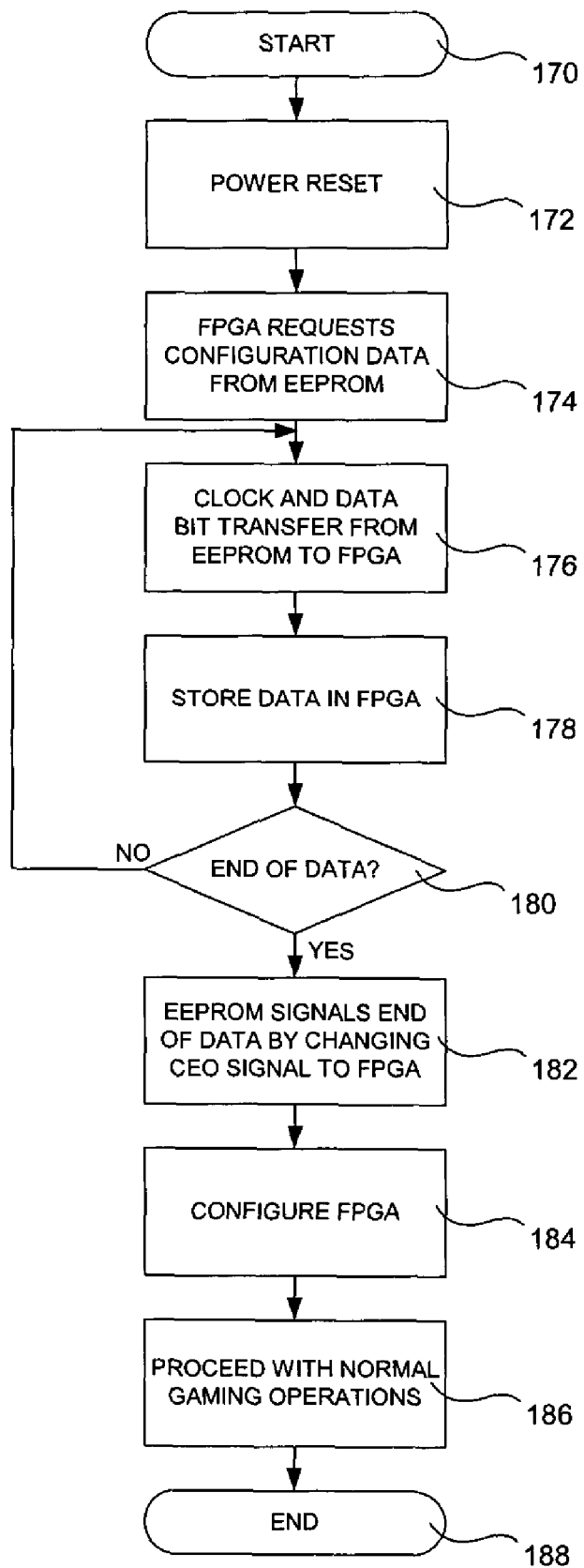
FIG. 4 illustrates a flowchart of one method of utilizing the particular electronic infrastructure as shown in FIG. 3 for providing gaming activities within a microprocessor based gaming machine.

FIG. 4 illustrates a flowchart of one method of utilizing the particular electronic infrastructure as shown in FIG. 3, and in particular the configurator and FPGA combination as shown in FIG. 3, for providing gaming activities within a microprocessor based gaming machine. After an initial or start stage 170, the method begins with a first process step 172 comprising a power reset of at least the FPGA, and preferably the entire gaming machine as well. While such a power reset typically refers to a complete powering down of at least the FPGA and preferably the entire gaming machine, it is contemplated that power reset step 172 can also be an instance of a significant portion of the critical contents within the FPGA being erased or reset while power to the FPGA and/or gaming machine remains on. The notable feature of step 172 then is that programming of the FPGA is required for some reason or other. Accordingly, at a next process step 174, a signal is sent that initiates or requests that the configuration file be sent from the configurating EEPROM or other configurator to the FPGA. Such a request is preferably generated by the FPGA itself, but can also originate from the configurator, the CPU, or some other component, as desired.

Once the request for configuration data is made in step 174, a first clock and data bit transfer from the configurating EEPROM to the FPGA is made at process step 176, upon which this data is stored in the FPGA at process step 178. In a preferred embodiment, the signal being sent across the data bit line is read by the FPGA when the clock bit line changes from 0 to 1, although other methods of transferring data are also contemplated, such methods being readily known to those skilled in the art. After the data from the data bit line is stored at process step 178, the FPGA then considers whether all data has been transferred at decision step 180. If all data has been transferred the method proceeds to process step 182, but if not then process steps 176 and 178 are repeated, whereby another clock cycle runs and another data bit is transferred from the configurator to the FPGA.

This data bit transfer process repeats itself until all data bits have been sent, whereupon, at process step 182, the configuring EEPROM signals the end of data by changing the signal across the CEO data bit line, the state of which can be changed from 0 to 1, for example. After this has been accomplished, the FPGA is then configured at a process step 184, and the gaming machine proceeds with normal gaming operations at process step 186, whereupon this particular FPGA start up or boot method is finished and comes to an end stage 188. This process only shows how data (i.e., the configuration file) is transferred from the configurator to the FPGA, however, and does not contain any steps or provisions for verifying or authenticating this data or configuration file.

As discussed previously, it is preferable that the configuration file inside the configurating EEPROM or configurator not only be merely sent to the FPGA, but also be authenticated or verified for a wide variety of operational and security reasons. By verifying the contents of the information that configures the FPGA devices, the operation of the gaming machine can be positively authenticated. Without this type of authentication, the operations of the gaming machine cannot be certified or predicted, and levels of jackpot hit frequencies, coin in and coin out metering, pay tables and the like cannot be guaranteed, due to potential tampering with or corruption of the data that configures the FPGA. It is thus preferable that the configuration file be verified or authenticated before it is transferred to the FPGA upon every boot or start up of the FPGA. This can be accomplished through any of number of methods and apparatuses, many of which are discussed in detail in the examples provided below.

The first example of a method for authenticating the configuration file before boot up is that the EEPROM or like device that is used to configure the FPGA must first be physically removed from the gaming machine and placed in a separate device that reads at least a sufficient representative portion of its contents. The read contents are then compared to those of a known good device or a custodial file that contains at least a sufficient representative portion or a complete copy of the correct configuration file. Preferably, entire files are read and compared, although it may be possible and practical in some instances to read only specific set portions of files. Once a comparison has been made and the contents are authenticated, the configuring EEPROM or like device is then re-installed in the appropriate socket or location within the gaming machine, whereupon it is permitted to transfer the configuration file into the FPGA.

The apparatus for reading the information from one EEPROM and verifying it by comparing it to a known good EEPROM can be, for example, an EEPROM Comparator, with such devices and the use of same being well known in the art. Such an EEPROM Comparator or a similar apparatus typically reads and compares each bit read from a tested or Master EEPROM to a corresponding bit read from a custodial or Slave EEPROM, and if any error exists between the Master EEPROM and Slave EEPROM, then an indicator such as a red LED could be turned on to indicate the error. If all bits match and the EEPROM being tested passes, then a green LED could be turned on indicating a passed or verified condition.

Such a physical removal of a configurating EEPROM or similar device is undesirable for a number of reasons as discussed above, however, such that it is preferable for the EEPROM Comparator or similar device to be clipped to the top of or otherwise attached to the configurating EEPROM or similar device in order to read its contents. Such a technique allows the information inside the configuring EEPROM or similar device to be read without actually removing the device, which advantageously eliminates the need to remove and re-install the configuring EEPROM. A specialized EEPROM Comparator for accomplishing this function comprises a plurality of contacts that can be placed in contact with the pins of the mounted EEPROM that is to be tested, such that the Comparator can be clipped to or rest atop the tested EEPROM or, alternatively, can be manually held or rest near the tested EEPROM, in the event that the plurality of contacts are appropriately attached or connected to insulated wire extensions, as will be readily understood by one skilled in the art. The process of reading and comparing the Master EEPROM and Slave EEPROM information is then the same as in the example above.

Even though the physical removal of an EEPROM to be tested is obviated by the foregoing method and apparatus, such techniques still disadvantageously tend to require at least a partial opening of the gaming machine and some manual intervention. Under the present invention, however, additional embodiments of the present invention are provided that can also obviate the need for any opening of the gaming machine and any manual intervention whatsoever. Such embodiments and examples include the use of an automated comparator, which comparator can be a separate electronic device or module, or can be contained within the CPU itself.

Figure 5:
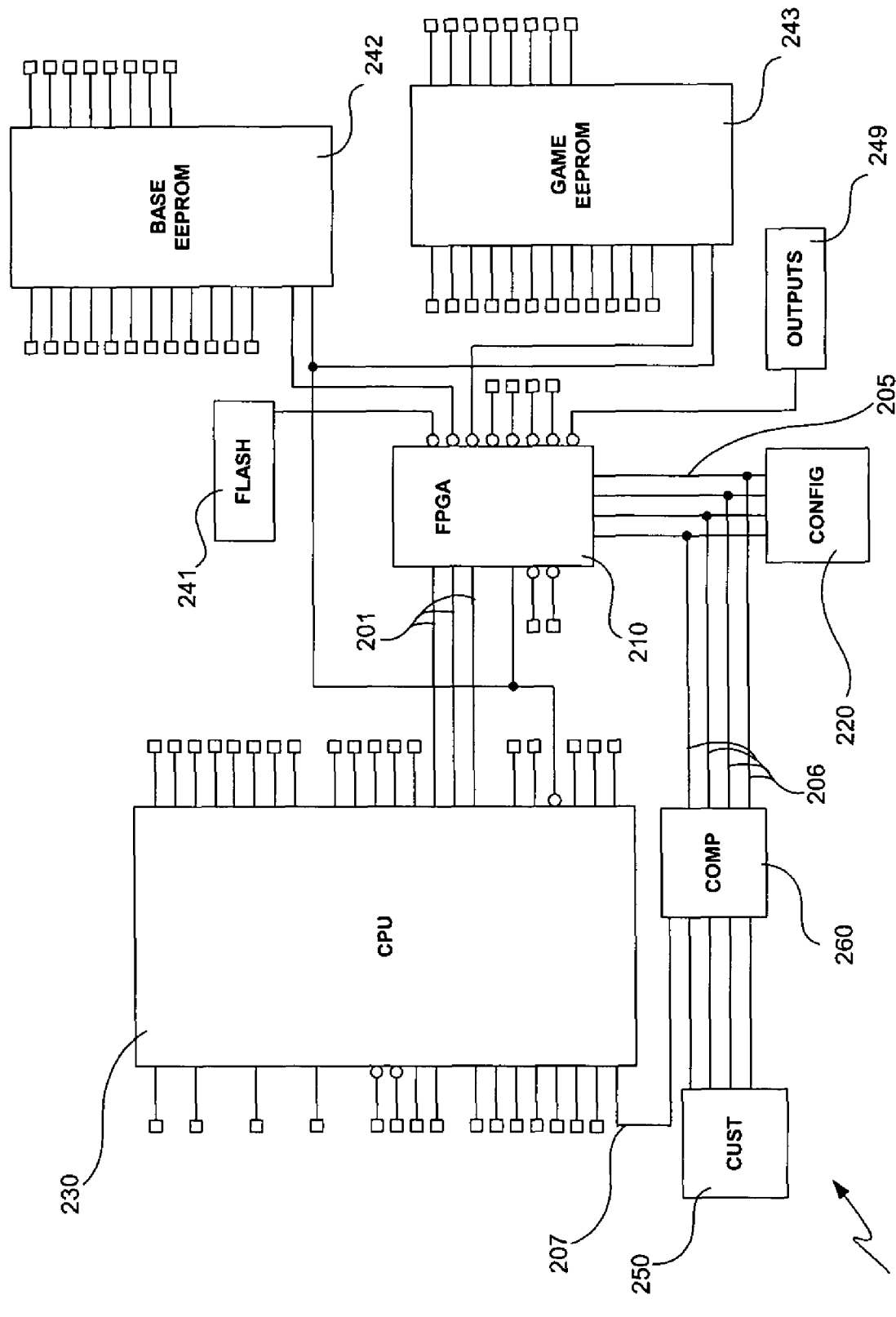
FIG. 5 illustrates a block diagram of a particular electronic infrastructure utilizing an FPGA, a configurator, a custodial file and a comparator for providing gaming activities within a microprocessor based gaming machine according to one embodiment of the present invention.

Turning now to FIG. 5, a block diagram of a particular electronic infrastructure utilizing an FPGA, a configurator, a custodial file and a separate automated electronic comparator module for providing gaming activities within a microprocessor based gaming machine according to a preferred embodiment of the present invention is illustrated. Electronic infrastructure 200 comprises a number of electronic devices and components for providing gaming activities within a gaming machine. Similar to the electronic infrastructure disclosed in FIG. 3, an FPGA or similar volatile programmable electronic device 210 is utilized in place of a simple bus decoder and/or one or more other routing components and logic blocks. As in the previous example, FPGA 210 comprises a number of internal components, such as, for example, one or more RAM units and an internal state machine (not shown), among others. FPGA 210 also requires at least one configurator 220 that stores a configuration file for configuring and programming the FPGA when power is applied. Configurator 220 comprises a ROM or other similar less volatile memory device, and in a particularly preferred embodiment comprises an EEPROM.

Once programmed, FPGA 210 facilitates communication between CPU 230 and a plurality of different electronic machine components, which can include, for example, various memory units such as a flash RAM 241, a base EEPROM 242, a game EEPROM 243, and an NV RAM (not shown), among others. Other examples include as many additional duplicate and other types of memory units as desired, as will be readily understood by those skilled in the art, as well as a variety of different switches and other various inputs and outputs. Such switches and other inputs and outputs are designated generically as outputs 249, with it being understood that any such type of hardware switch, input or output can be used, and that such additional hardware connections can be made to FPGA 210 in a manner similar to those made for flash RAM 241, base EEPROM 242, game EEPROM 243 and outputs 249.

Communications to, from and through FPGA 210 are preferably made via any number of simple direct FPGA connections, such as CPU to FPGA direct lines 201 and configurator to FPGA direct lines 205, in addition to many other non-referenced and non-illustrated lines, whereby input or output to and from the FPGA is preferably routed and/or processed within the FPGA itself Other communications types and modes are possible though, such as those described in foregoing examples, as will be readily understood by those skilled in the art. Direct communication lines 205 can reside on a bus or on a printed circuit board (PCB), and preferably comprise at least one interrupt-reset control bit line, one clock bit line, one data bit line, and one control-CEO bit line, although other amounts and line configurations are also contemplated. In addition, monitoring or communication lines 206 allow one or more additional devices to receive data from configurator 220, with such additional monitoring or communication lines preferably branching off from and being identical to configurator to FPGA direct lines 205.

According to a preferred embodiment of the present invention, a custodial file, at least of portion of which is substantially identical to at least a portion of the configuration file, is kept within a memory device or like item at a separate custodial location 250. This custodial memory device 250, which may also be an EEPROM, is in communication with at least an automated electronic comparator module or component 260, which is capable of comparing data bits from both the official configuration file and the custodial file on demand. Accordingly, monitoring lines 206, as well as similar bit lines from custodial memory device 250 are connected to comparator 260, with such a comparator being able to compare the data being sent across lines 206 (and thus lines 205) with data from the custodial file within custodial memory device 250. The results of the comparison can then be communicated to the CPU 230 via communication line 207, whereupon the CPU can act appropriately to display a message, if desired, and either to halt the FPGA and gaming operations, if necessary, as the result of a failure to authenticate the configuration file, or to allow gaming operations to proceed, as a result of a successful authentication.

Under the electronic infrastructure embodied in FIG. 5, comparator 260 presumably monitors configuration data as it is being booted into the FPGA 210, such that the FPGA is actually being configured before authentication is given, and action to halt operations of the FPGA and/or hold it in reset can typically not happen until after it has been booted up and configured. Such actions can be accomplished, for example, from the CPU to the FPGA directly across communication lines 201, or through one or more other components and/or communication means, as desired. Alternatives for holding the FPGA in reset until a file comparison and authentication is actually made are provided in other embodiments below.

Also, while the custodial file is shown as being on a memory device or other like item 250 at a separate and distinct location from the automated comparator module 260, it is also contemplated that this location, and thus the custodial file, actually be contained within the comparator itself. Similarly, other embodiments are also contemplated wherein the custodial file and/or comparator are located elsewhere within or outside the gaming machine, with such components being independent and/or contained within one or more other sovereign machine components. Examples of such additional embodiments, as well as additional features, are further disclosed in greater detail below.

Figure 6:
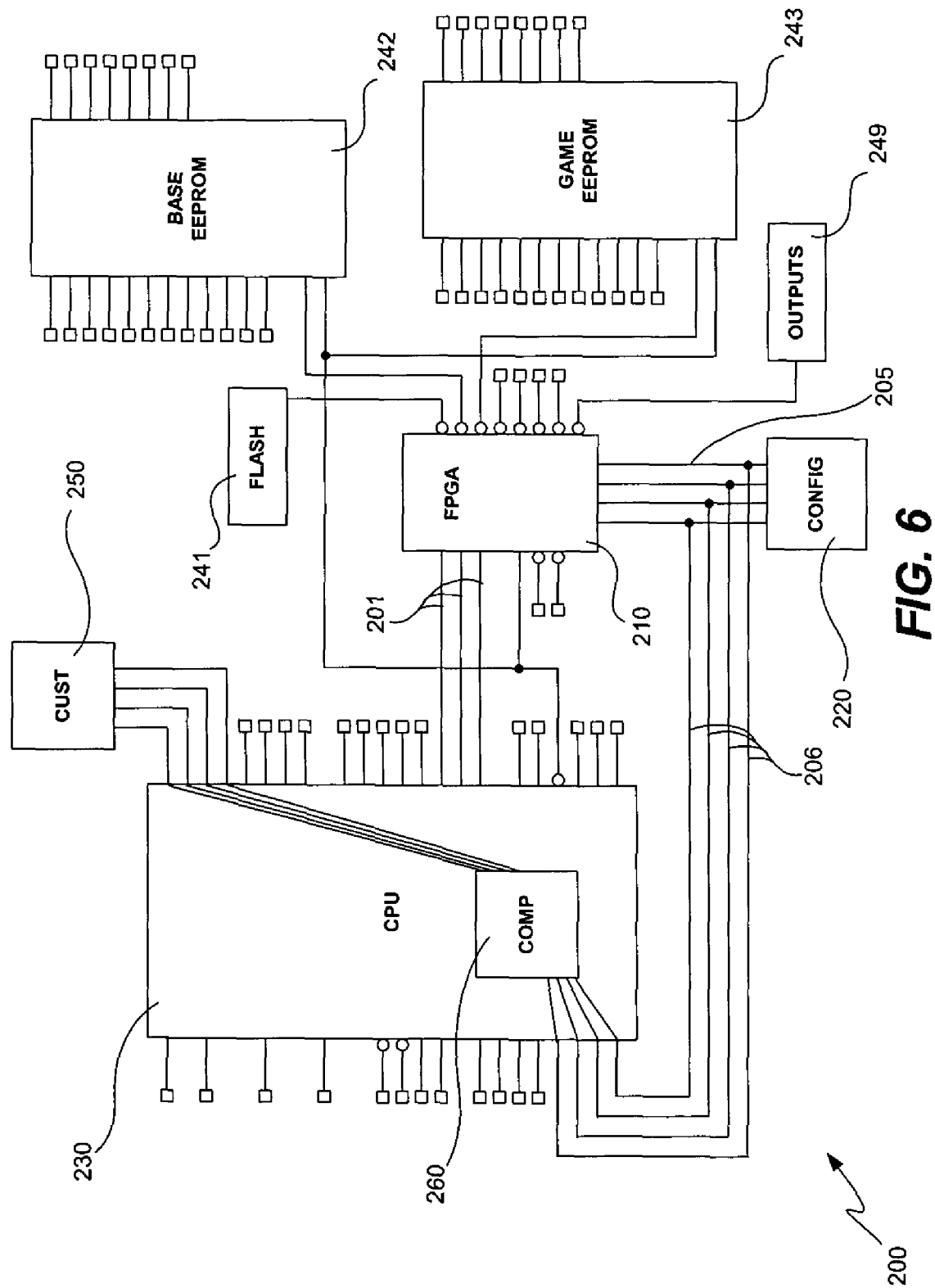
FIG. 6 illustrates a block diagram of an alternative particular electronic infrastructure utilizing the same components as shown in FIG. 5 according to another embodiment of the present invention.

Referring now to FIGS. 6-9, block diagrams of several alternative electronic infrastructures according to other embodiments of the present invention utilizing substantially the same or similar components as shown in FIG. 5 are illustrated. In FIG. 6, a particularly preferred embodiment is illustrated, whereby the comparator 260 is actually located within the CPU 230. Although desirable, it is specifically contemplated that it is not necessary to actually designate one module or location within the CPU as the actual comparator, such that in the event that all typical functionalities of a comparator cannot be readily isolated to one general location or module within the CPU, then the CPU can be said to be the comparator itself. In such an embodiment where the comparator is within or is the CPU, communication lines 206 are preferably connected directly to the CPU, at which point the appropriate connections are made within the CPU to transmit information and data to the comparator or appropriate locations within the CPU as needed. Although the custodial file is located on a separate memory device 250 that is in direct communication with the CPU, other locations for this custodial file are also possible, with several examples being presented in other embodiments below.

As in the foregoing example, the FPGA and the comparator (or CPU) can both read the configuration file from the configurator (i.e. configurating EEPROM) at the same time, which is typically when the FPGA reads the information from the configurator for programming purposes. The comparator reads the same information at the same time for verification and authentication purposes, such that the data readings by the FPGA and comparator are done substantially in parallel. If the data is correct and a match is verified, then the CPU would execute in a normal manner, such that normal gaming machine operations would proceed. If a match is not verified, or any other significant error or irregularity occurs, then the comparator would preferably signal the CPU to disable all commands from the FPGA, direct the FPGA to empty its contents, and designate an error or other appropriate message.

In another embodiment, it is also contemplated that the comparator (or CPU) could accept and read the data that programmed the FPGA as it booted up, but that an actual comparison and/or acceptance or rejection not be made until some later time. If the configuration data was correct during the boot up, then the CPU would execute in a normal manner and regular gaming machine operations would proceed. If the configuration data was not correct at boot up, however, then the CPU would execute in an error annunciation manner, halt any further operations of the gaming machine, and take appropriate action with respect to the FPGA. An error enunciation manner may include the display of an error message, a shut down of the machine, one or more alarms, and/or other security measures, as desired. A "delayed comparison" embodiment may be desirable, for example, in instances where the CPU is already burdened with many other tasks upon machine start up, such that the FPGA can be configured before the configuration data that actually booted into it is later checked. Preferably, such a check is made relatively soon after the machine is powered up.

Figure 7:
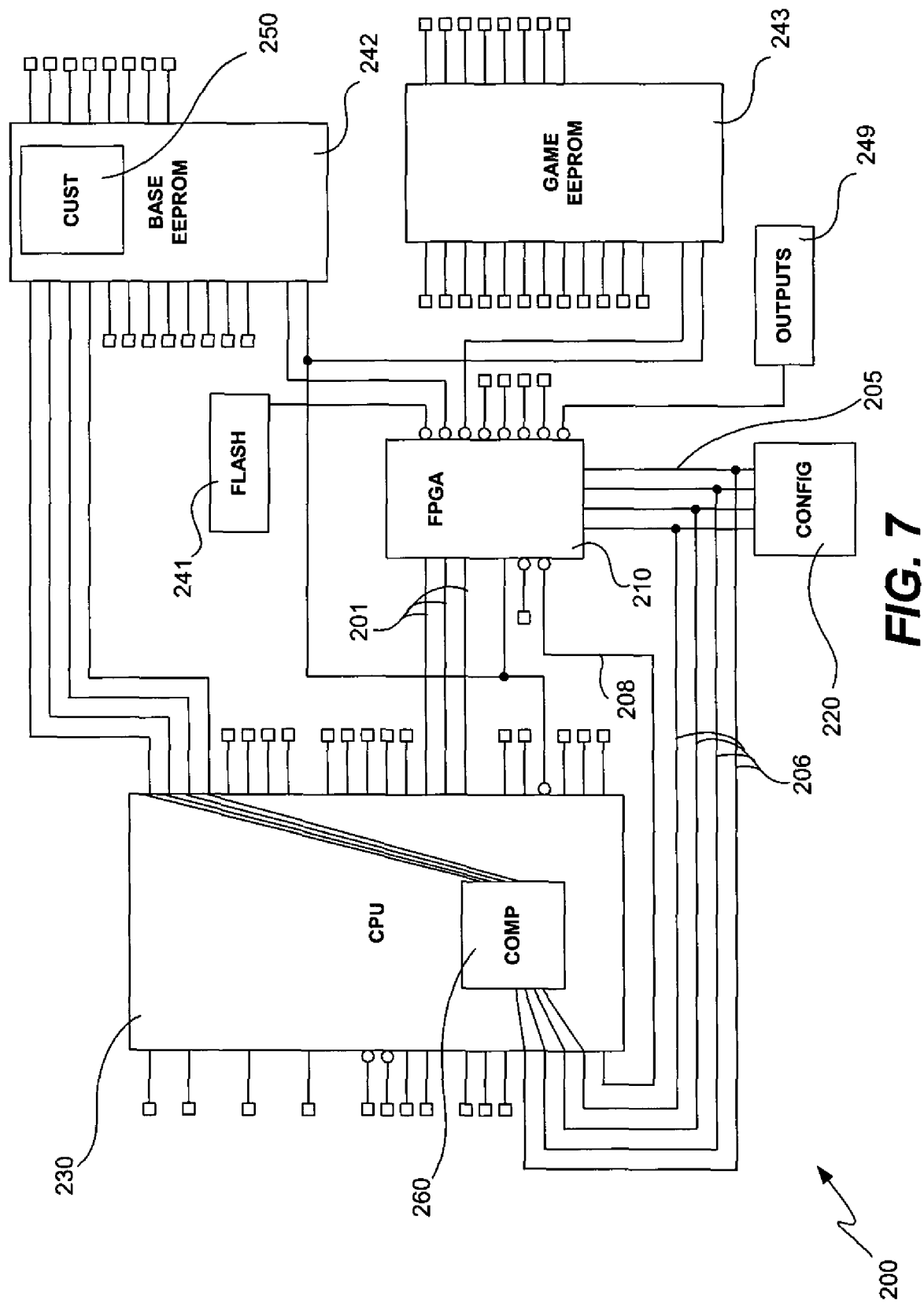
FIG. 7 illustrates a block diagram of another alternative particular electronic infrastructure utilizing the same components as shown in FIG. 5 according to yet another embodiment of the present invention.

In FIG. 7, the custodial file 250 is actually located on or within another machine component, such as base EEPROM 242, with special direct connections being made to the CPU 230 from this custodial file. As will be readily understood, this custodial file 250 can also reside on or within any of a number of other memory devices within the gaming machine, such as game EEPROM 243, for example. According to another particularly preferred embodiment, an extra CPU to FPGA control line 208 is provided, whereby the CPU can hold the FPGA in reset mode until the configuration file is verified. Under such an embodiment the configuration data is first sent over lines 205, 206 from the configurator 220 to the comparator 260 while the FPGA 210 is held in reset by the CPU 230 over control line 208. If the configuration file is verified against the custodial file 250 and its contents approved, then the configuration data is again sent over lines 205, 206, but this time with no reset control signal being sent over control line 208, such that the configuration file can be booted into and configure the FPGA. If desired, the comparator 260 can also monitor this second transmission of configuration data across lines 205, 206.

Figure 8:
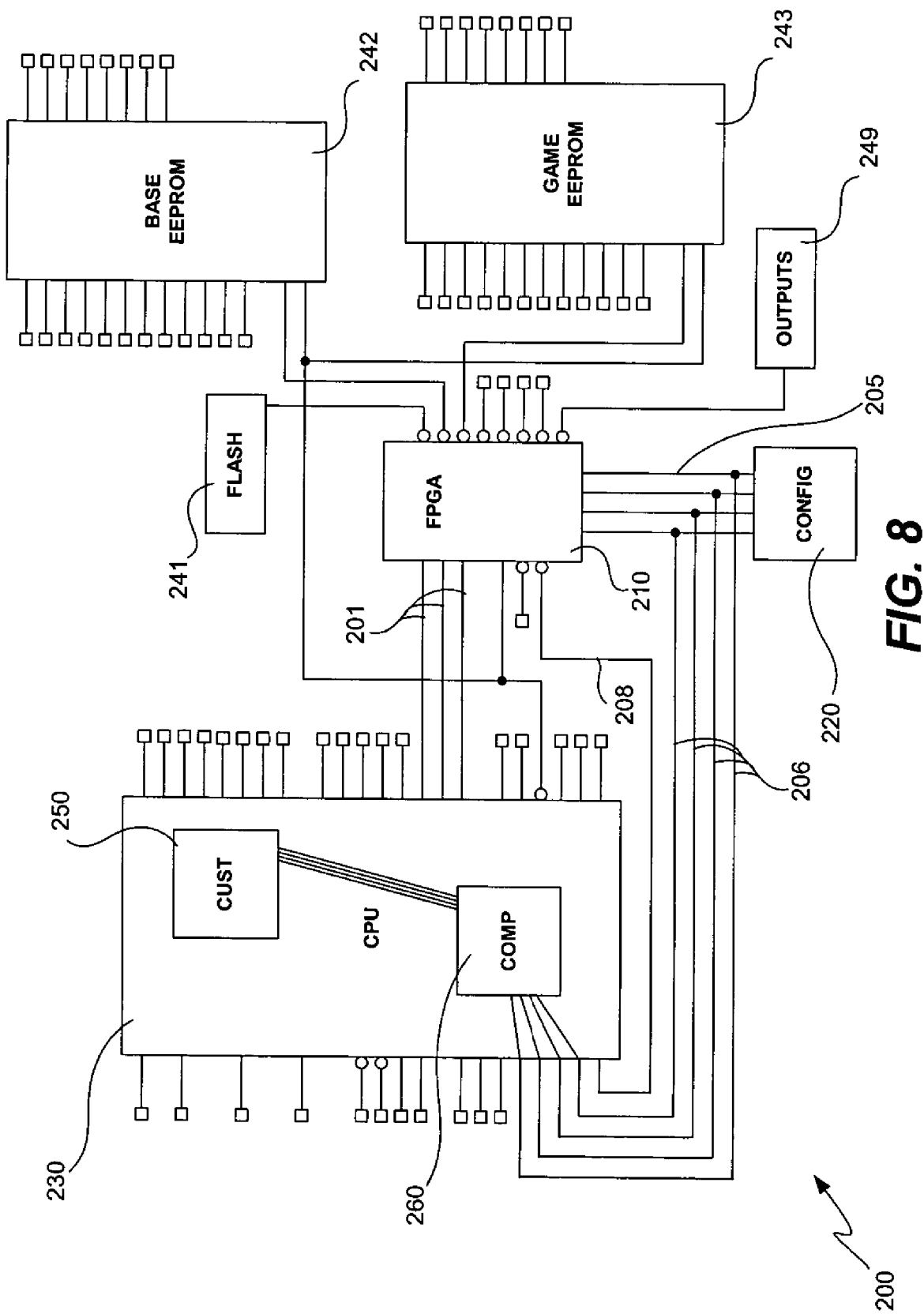
FIG. 8 illustrates a block diagram of yet another alternative particular electronic infrastructure utilizing the same components as shown in FIG. 5 according to yet another embodiment of the present invention.

In FIG. 8, another preferred embodiment is presented whereby the custodial file 250 and comparator 260 are both actually located within the CPU 230. CPU to FPGA control reset line 208 is also included in this embodiment, such that the FPGA can be held in reset until the configuration file in configurator 220 is verified and authenticated. Such an arrangement makes cut and jump or other hack techniques especially difficult, since so much of the authenticating infrastructure is located within the CPU itself, which is presumably difficult or impossible to dissect and reprogram or otherwise defraud. In this, and in other of the foregoing examples and embodiments, it is also possible to verify the contents of the configuration file in the configurator externally by providing a Joint Test Action Group (JTAG) connector or other appropriate probe that can be connected to a designated location, such as on a CPU port or ports or, alternatively, on the configurator itself.

Figure 9:
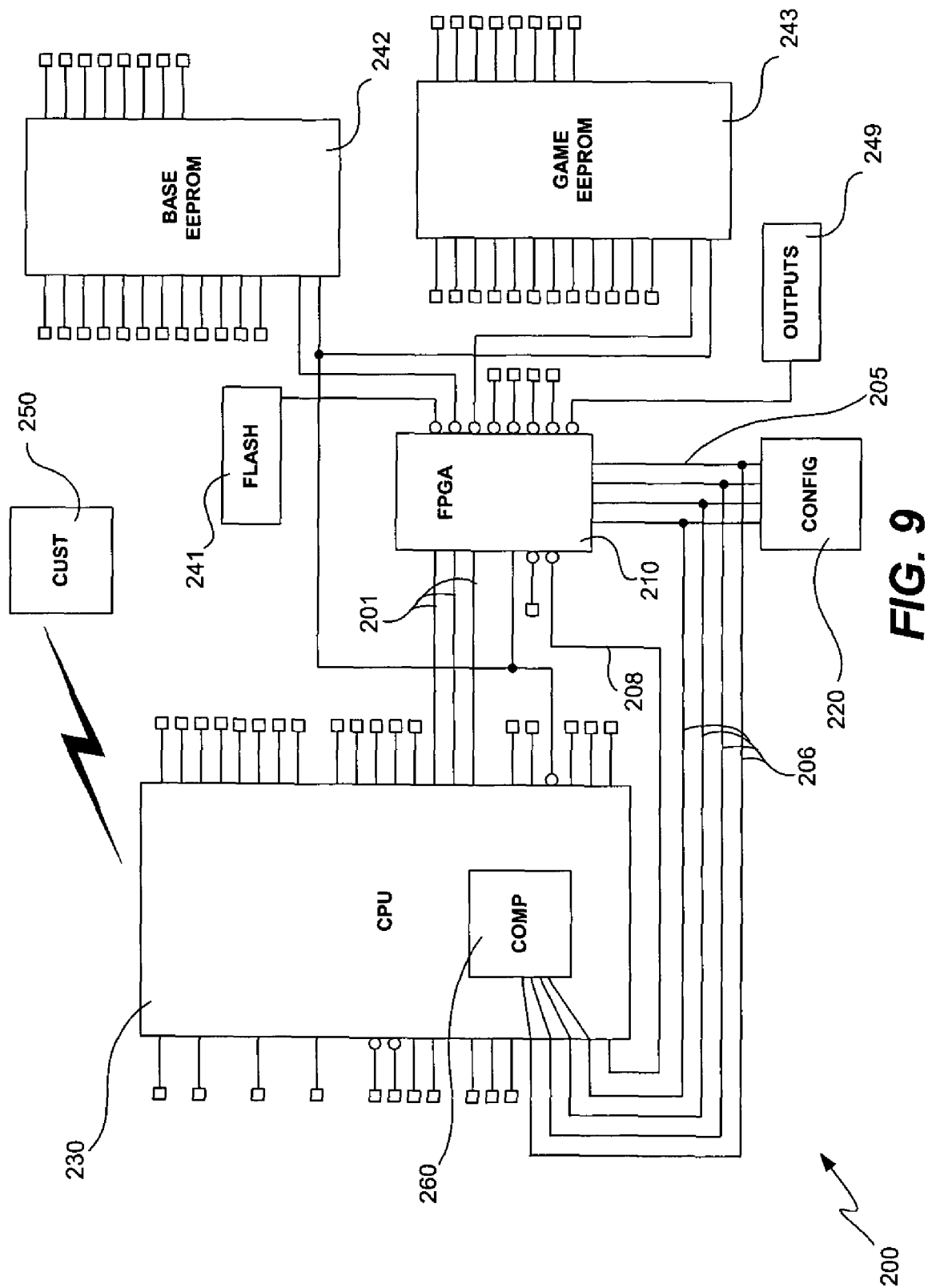
FIG. 9 illustrates a block diagram of still another alternative particular electronic infrastructure utilizing the same components as shown in FIG. 5 according to yet another embodiment of the present invention.

In FIG. 9, another preferred embodiment of the present invention is presented whereby the custodial file 250 resides at some external location, such as on a network or a hand-held RF authenticating device. Again, CPU to FPGA control reset line 208 is also included in this embodiment, such that the FPGA can be held in reset until the configuration file in configurator 220 is verified and authenticated. While a true custodial file is preferably kept at a remote location, such as on a network, a copy custodial file can also reside on RAM or some other less volatile memory component within the CPU. Under this embodiment, the information that authenticates the configuration file and/or configures the FPGA device can actually be updated by downloading new code via a network connection. As with introducing a way to provide for a JTAG connector or other probe of the CPU, configurator or other appropriate machine component for authentication status of the configuration file in the foregoing examples, this method and apparatus also eliminates the necessity of removing the configurating EEPROM and/or other associated or like parts from the gaming machine in order to verify their content.

Figure 10:
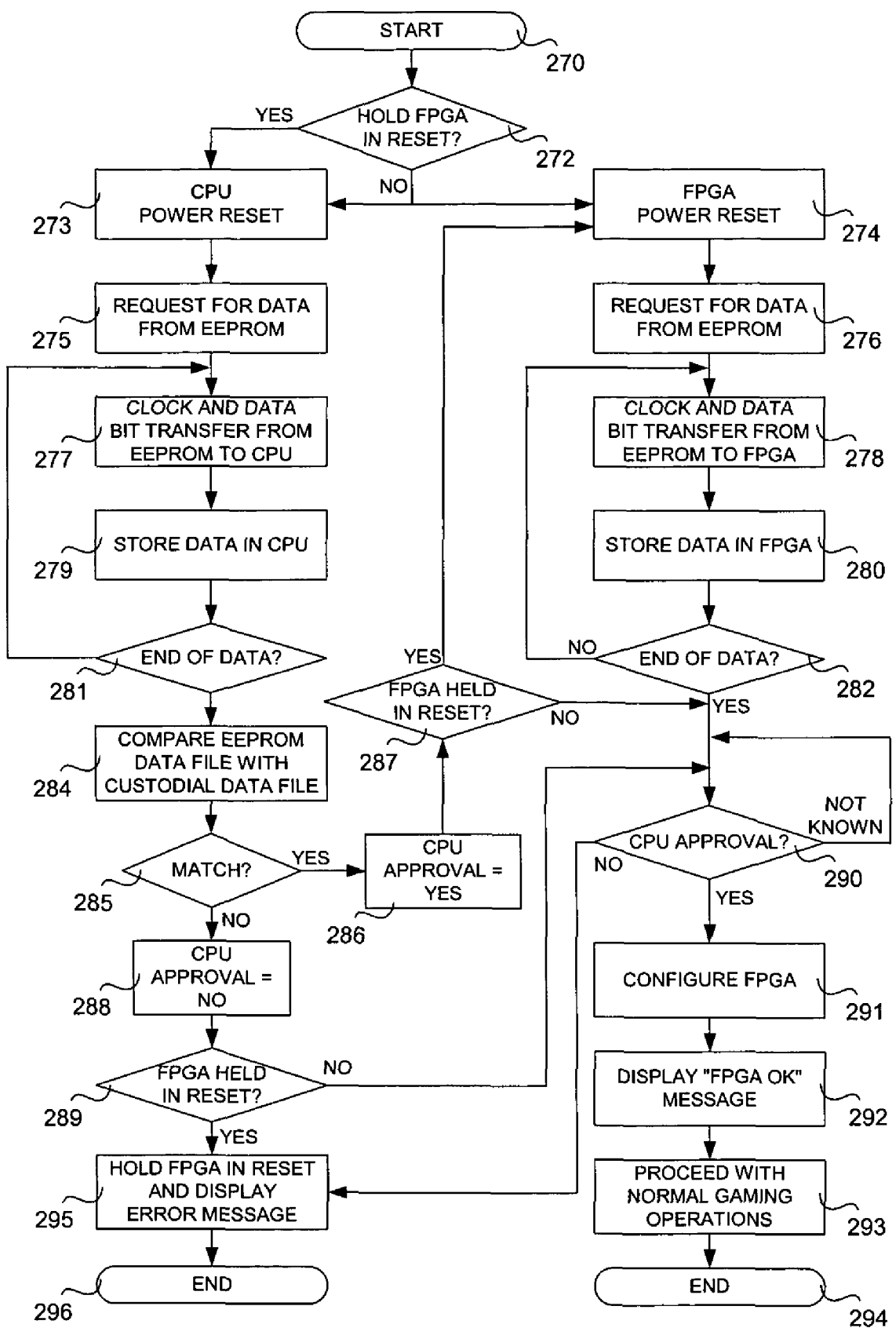
FIG. 10 illustrates a flowchart of one method of utilizing the particular electronic infrastructures as shown in any of FIGS. 5 through 9 for providing gaming activities within a microprocessor based gaming machine.

Turning now to FIG. 10, a flowchart of one method of utilizing the particular electronic infrastructures as shown in any of FIGS. 5 through 9 for providing gaming activities within a microprocessor based gaming machine is illustrated. After an initial or start stage 270, the method begins with a decision step 272, whereby it is decided whether or not to hold the FPGA in reset until a verification and authentication of the proposed configuration file is complete. In some embodiments, such as that which is presented in FIG. 5, a holding of the FPGA in reset mode is presumably not possible, while in other embodiments, such a hold may be optional, or designed as mandatory, as desired. In the event that the FPGA is indeed held in reset at step 272, then the method proceeds to process step 273, and will eventually wind up at either process step 274 or 295, depending upon a further determination at decision step 285. In the event that the FPGA is not held in reset at step 272, then the method proceeds in parallel at both of process steps 273 and 274, upon which the eventual rejoinder of both parallel processes will take place at decision step 290. Also, it is worth noting that while processes involving the CPU are mostly recited throughout this method, such processes may also include the comparator acting separately, which actions must ultimately be reported to the CPU.

Under either result from decision step 272, a next process step 273 involves the power reset of at least the CPU, and preferably the entire gaming machine as well. Similar to the foregoing process example, while such a power reset typically refers to a complete powering down of at least the CPU and/or FPGA, and preferably the entire gaming machine, it is contemplated that CPU power reset step 273 can also be an instance of a significant portion of the critical contents within the CPU and/or FPGA being erased or reset while power to the CPU and FPGA remains on. The notable feature of step 273 then is that programming or re-authenticating of the FPGA is required for some reason or other. Accordingly, at a next process step 275, a signal is sent that initiates or requests that the configuration file be sent from the configurator to the FPGA (or, in some cases, the comparator or CPU). Again, such a request is preferably generated by the FPGA itself, but can also originate from the configurator, the CPU, or some other component, as desired. Importantly, as a result of the authentication process, the configuration file will either be sent to the CPU first or, preferably, will be sent to both the CPU (i.e. comparator) and the FPGA at the same time.

After the request for configuration data is made in step 275, a first clock and data bit transfer from the configurating EEPROM to the CPU (i.e. comparator) is made at process step 277, upon which this data is stored in the CPU (i.e. comparator) at process step 279. As in the foregoing process example, the signal being sent across the data bit line is preferably read by the CPU or comparator when the clock bit line changes from 0 to 1, although other methods of transferring data are also contemplated, such methods being readily known to those skilled in the art. After the data from the data bit line is stored at process step 279, the CPU (i.e. comparator) then considers whether all data has been transferred at decision step 281. If all data has been transferred the method proceeds to process step 284, but if not then process steps 277 and 279 are repeated, whereby another clock cycle runs and another data bit is transferred from the configurator to the CPU or comparator.

In the event that the FPGA is not held in reset, then process steps 274, 276, 278, 280 and decision step 282 are performed substantially in parallel and in conjunction with steps 273, 275, 277, 279 and 281, and in a substantially similar manner, with the only difference being that the FPGA is in power reset and the FPGA is receiving and storing the data bits. This data bit transfer process repeats itself until all data bits have been sent, whereupon the configuring BEPROM signals the end of data by changing the signal across the CEO data bit line, the state of which can be changed from 0 to 1, for example, signifying an affirmative response to the "end of data?" inquiries at decision steps 281 and 282. The next step on the FPGA side of the flowchart after step 282 is decision step 290, whereby an inquiry as to the state of CPU (or comparator) approval is made. In the event that the FPGA is not held in reset, then such approval will not be known for at least several more process steps, and this branch of the split process preferably waits in a loop at this step until such a state is determined, the determination of which will eventually be received from either step 287 or step 289. In an alternative technique, this branch of the split process can proceed to step 291, with later action from the CPU being required in the event that a match is not confirmed and approval is not given.

The next process step on the CPU side of the flowchart after step 281 is process step 284, whereby the newly transferred data is compared with data from the custodial data file. At a next decision step 285, an inquiry is then made as to whether there is a match between these two files, with CPU approval being given at a next process step 286 if there is a match, and CPU approval being denied at a next process step 288 if there is no match or some other error or irregularity occurs. In either event, the next step is a decision step that provides an inquiry as to whether the FPGA was originally held in reset, which is made at decision steps 287 and 289.

At decision step 287, wherein CPU approval must be YES, the method is sent to process step 274 if the FPGA was originally held in reset, but is sent to decision step 290 if the FPGA was not originally held in reset. This represents what occurs when the FPGA is first held in reset while the configuration file is verified and authenticated, in that data is not read into the FPGA until a proper authentication occurs. Under either result of decision step 287, the process eventually arrives at decision step 290, which inquires as to CPU approval. Because CPU approval must be YES when coming from decision step 287, the method then proceeds to process step 291, whereby the FPGA is fully configured. At a next process step 292, an "FPGA OK" or other similar approval message is displayed. At a final process step 293, full gaming machine operations proceed as normal, whereupon the method terminates at an end stage 294.

Conversely, at decision step 289, wherein CPU approval must be NO, presumably as a result of bad or pirated data or some other error, the method is sent to process step 295 if the FPGA was originally held in reset, but is sent to decision step 290 if the FPGA was not originally held in reset. Although the process quickly winds up at process step 295 under either result of the inquiry at decision step 289, this covers the instance of when the FPGA is not held in reset and has received bad or erroneous data during its boot up under the parallel process. In such an instance, there preferably must be an ability to interrupt or otherwise halt the FPGA from further activity, which is why it is preferable for the decision step 290 to loop back upon itself until it receives an actual determination of a CPU approval state. In both cases, the method then continues to process step 295, whereby the FPGA is held in reset, an error message is displayed, and/or one or more alarms or alerts are sent out that the gaming machine has a problem, whereupon the method then terminates at an end stage 296.

According to this foregoing method detailing the preferred process used in the electronic infrastructures presented in FIGS. 5-9, and unlike the method presented in FIG. 4 for the simpler electronic infrastructure of FIG. 3, the EEPROM or like device that is used to configure the FPGA can remain inside the gaming board. Hence, the configuration data or information inside the configurating EEPROM is to be read and verified by a comparator within the gaming machine itself before, during or after the FPGA is configured, thereby providing several distinct advantages over methods and systems that require the physical removal of the configurating EEPROM for authentication purposes.

Figure 11:
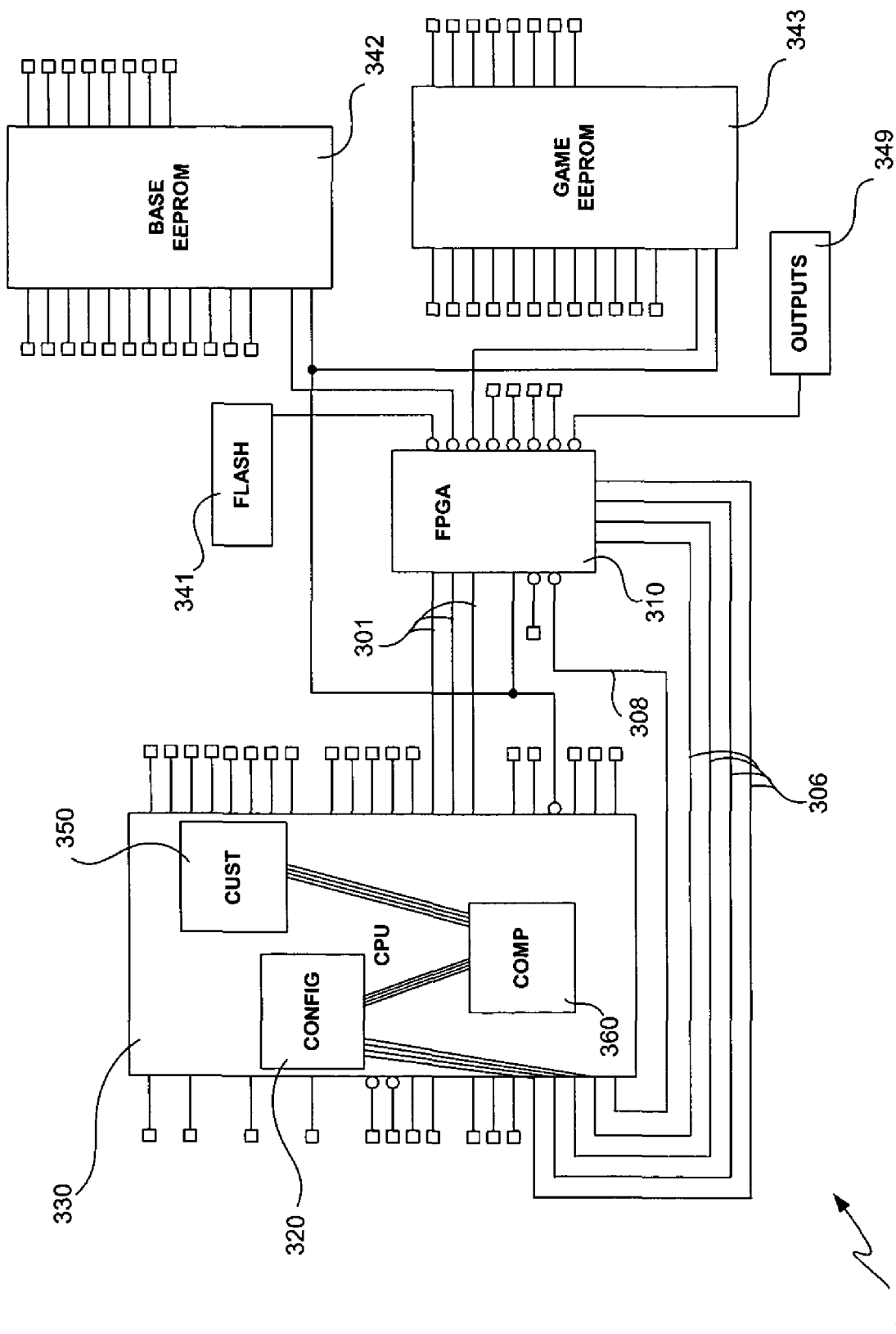
FIG. 11 illustrates a block diagram of a particularly preferred alternative electronic infrastructure utilizing the same components as shown in FIG. 5 according to a particularly preferred embodiment of the present invention.

Turning now to FIG. 11, a block diagram of a particularly preferred alternative electronic infrastructure utilizing the same components as shown in FIG. 5 according to a particularly preferred embodiment of the present invention is illustrated. In this alternative embodiment, which is similar in some ways to the embodiments presented in FIGS. 5-9, electronic infrastructure 300 similarly comprises a number of electronic devices and components for providing gaming activities within a gaming machine. An FPGA or similar volatile programmable electronic device 310 is utilized in place of a simple bus decoder and/or one or more other routing components and logic blocks, and as in the previous example, FPGA 310 comprises a number of internal components, such as, for example, one or more RAM units and an internal state machine (not shown), among others. FPGA 310 also requires at least one configurator 320 that stores a configuration file for configuring and programming the FPGA when power is applied. Unlike the foregoing embodiments, however, configurator 320 either resides on CPU 330, or the CPU is able to perform substantially all functions of a configurator such that it can be considered the configurator itself.

As in the foregoing examples, FPGA 310 facilitates communication between CPU 330 and a plurality of different electronic machine components, which can include, for example, various memory units such as a flash RAM 341, a base EEPROM 342, a game EEPROM 343, and an NV RAM (not shown), among others. Other examples include as many additional duplicate and other types of memory units as desired, as will be readily understood by those skilled in the art, as well as a variety of different switches and other various inputs and outputs. Such switches and other inputs and outputs are designated generically as outputs 349, with it being understood that any such type of hardware switch, input or output can be used, and that such additional hardware connections can be made to FPGA 310 in a manner similar to those made for flash RAM 341, base EEPROM 342, game EEPROM 343, outputs 349 and other like components.

Communications to, from and through FPGA 310 are preferably made via any number of simple direct FPGA connections, such as CPU to FPGA direct lines 301 and configurator-within-CPU to FPGA direct lines 306, in addition to many other non-referenced and non-illustrated lines, whereby input or output to and from the FPGA is preferably routed and/or processed within the FPGA itself. Other communications types and modes are possible though, such as those described in foregoing examples, as will be readily understood by those skilled in the art. Direct communication lines 306 can reside on a bus or on a PCB, and preferably comprise at least one interrupt-reset control bit line, one clock bit line, one data bit line, and one control-CEO bit line, although other line configurations are also contemplated.

What is notable about this particular embodiment is that substantially all of the configuring and authenticating components are contained within the CPU 330 itself That is, configurator 320, custodial file 350, and comparator 360 are all either within the CPU as distinct units, or the CPU can be considered to be one or more of these units, as it is programmed to contain and perform all necessary memory and functions required of these units. Accordingly, a separate EEPROM is not used to program the FPGA, but instead the CPU itself actually provides the programming information to the FPGA, and verifies and authenticates this information on its own in an automated manner upon start up. As in the example provided in FIG. 8, such an embodiment is preferable in that cut and jump and other hacking techniques are rendered more difficult or impossible when such infrastructure is built into the CPU.

Figure 12:
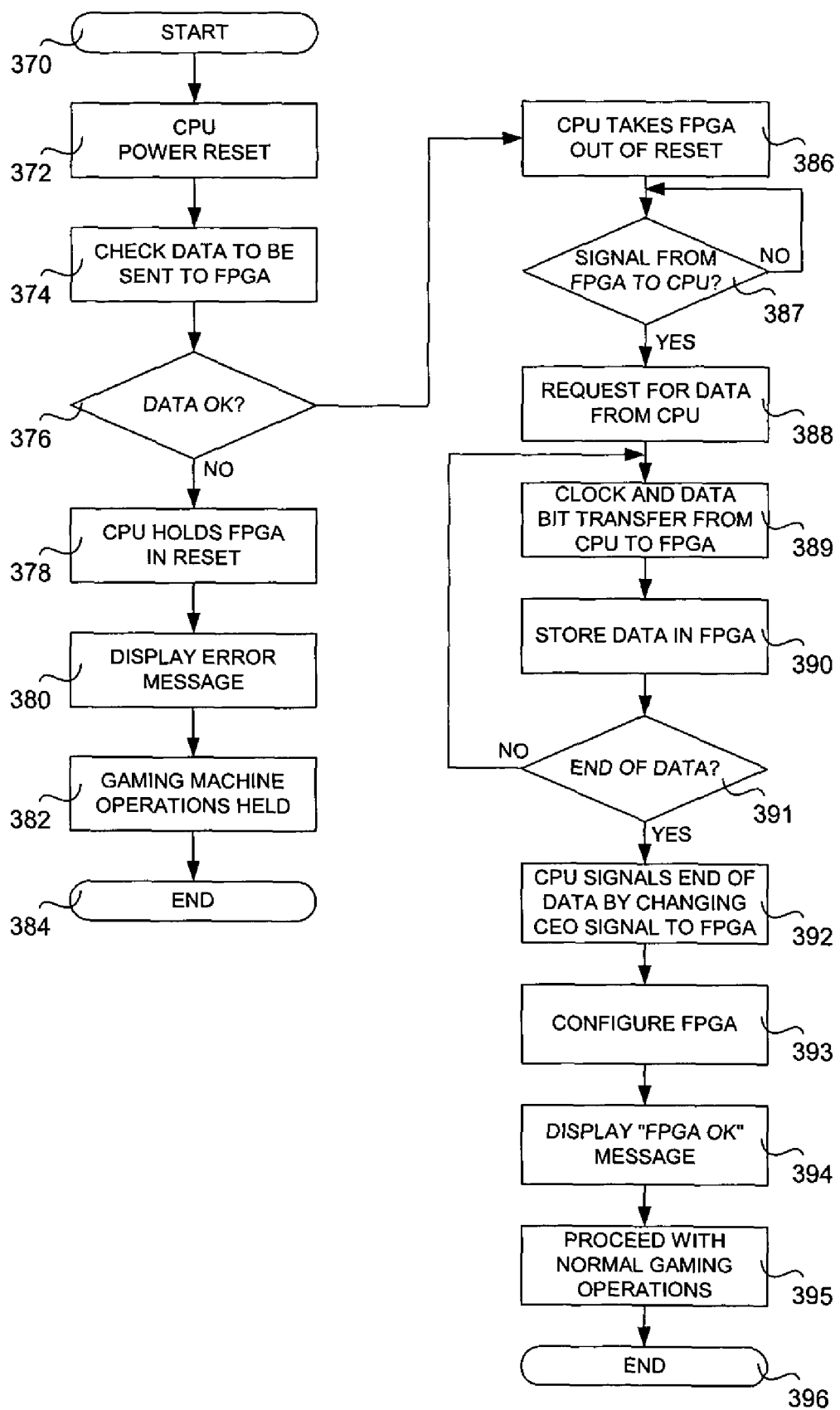
FIG. 12 illustrates a flowchart of one method of utilizing the particular electronic infrastructures as shown in FIG. 11 for providing gaming activities within a microprocessor based gaming machine.

FIG. 12 illustrates a flowchart of one method of utilizing the particular electronic infrastructures as shown in FIG. 11 for providing gaming activities within a microprocessor based gaming machine. Such a method essentially follows that which is already provided in FIGS. 4 and 10, wherein the FPGA is preferably held in reset until an appropriate verification and authentication of the configuration file is made. After an initial or start stage 370, the CPU and/or FPGA power is reset at a process step 372, with the full meaning of this step being substantially similar to the full meaning as explained in comparable power reset steps above. At a next process step 374, several of the detailed process steps in the foregoing example are combined to result in the reading and checking of data from the configuration file to be sent to the FPGA. At a next decision step 376, an inquiry is made as to whether the data has been authenticated or is ok. If so, then the method proceeds to process step 386, but if not, then the method instead proceeds to process step 378.

In the event that the data from the internal configuration file is not authenticated or some error occurs, then at process step 378 the CPU continues to hold the FPGA in reset (or, in the event that the FPGA was not held in reset to being with, it is first put into reset). At a next process step 380, an error or other appropriate negative message is displayed, and at the next process step 382 the normal activities and operations of the gaming machine are aborted or held up, whereupon the method reaches a termination or end stage 384.

In the event that the data from the internal configuration file is indeed authenticated, then at process step 386 the CPU takes the FPGA out of reset. At a next decision step 387, the CPU inquires as to whether a ready signal has been sent from the FPGA to the CPU. If not, then step 387 loops back onto itself and waits until such a signal is sent. When such a signal is sent, then the method proceeds to a process step 388, where the FPGA sends the CPU a request to send or transfer the configuration data from the CPU to the FPGA. At a next process step 389, clock and data bits are then transferred to the FPGA, and are stored in the FPGA at the next process step 390. Similar to the foregoing examples, an inquiry is then made at a decision step 391 as to whether all of the data has been transferred. If not, then steps 389 and 390 are repeated until all data has indeed been transferred. At that point, the method then continues to process step 392, where the CPU signals the end of the data to be transferred by altering the CEO signal to the FPGA, such that the FPGA realizes that data transfer is complete. At a next process step 393 the FPGA is then configured through use of the full configuration file, and at a next process step 394 an "FPGA OK" or other like appropriate positive message is displayed on the gaming machine. At a final process step 395 the CPU and gaming machine proceed normally with standard gaming operations, whereupon a terminal or end stage 396 is reached.

According to yet another embodiment of the present invention, the volatile programmable electronic device to be secured can be merely an SPLD or CPLD, instead of an FPGA, as it is also frequently necessary to verify these programmable devices when they are utilized instead of the typically more preferable FPGA. Such a device can comprise, for example, a model XC9536 CPLD manufactured by Xilinx, Inc. of San Jose, Calif., although other SPLDs and/or CPLDs can also be used. Like an FPGA, many of these types of devices are not OTP type devices, which means that they can also be reprogrammed, and as such, tampered with. New code can be downloaded into such devices via a common connection such as a JTAG connector, which has standard levels, timing and the like that allow manufacturers to program different devices in the system. In-System Programming (ISP) via a JTAG connector can be used to verify the programmable and/or programmed component of a volatile programmable electronic device, such as an SPLD or CPLD. In addition to verifying the part, the JTAG connector can be used to diagnose other parts or components within the gaming machine as well.

Presently, the gaming industry uses the JTAG connectors only in the manufacturing of SLPD and CPLD products but not in field applications. To verify JTAG programmable devices in the field, it is possible to connect one or more of such devices to the JTAG connectors, and then read the information from those one or more devices on that connector, as more than one device may be on a single JTAG connector. Similar to the foregoing examples for FPGAs, the information read from a device being verified or authenticated over a JTAG can be compared to a custodial file of known values. If the files compare, then reprogramming is not necessary, but if the files do not compare, then appropriate error messages or alerts can be given, and the devices on that JTAG may be reprogrammed.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A method of authenticating configuration data within or about a gaming machine with respect to a gaming machine boot process, the method comprising:

configuring a central processing unit to execute executable programming instructions to generate a wager-based game on the gaming machine;

storing the executable programming instructions in a memory device for generating the wager-based game;

connecting a volatile programmable electronic device comprising a plurality of logic elements programmable to form logic gates in a communication path between the central processing unit and the memory device;

monitoring a communication between the central processing unit and at least one of an input device and an output device by using the volatile programmable electronic device;

storing instructions for configuring the volatile programmable electronic device to enable communications between the central processing unit and the memory device, wherein said storing instructions comprises storing the instructions within a read only configuration file included within a configurator;

accessing a separate read only custodial file, wherein at least a substantial portion of said custodial file is identical to at least a substantial portion of said configuration file when said configuration file is authentic, said custodial file residing in a location separate from said configurator;

determining whether to hold said volatile programmable electronic device in a reset mode;

if the reset mode is held, holding a plurality of operating contents of said volatile programmable electronic device as substantially empty upon a shut down phase of said gaming machine to disable communication between the central processing unit and the memory device;

booting up said gaming machine after said shut down phase;

transferring said configuration file from said configurator to said volatile programmable electronic device;

comparing at least a representative portion of data from said configuration file with at least a representative portion of data from said custodial file;

confirming whether said configuration file has been successfully compared to said custodial file;

continuing to hold said volatile programmable electronic device in the reset mode until said confirming of said successful comparison is completed;

configuring said volatile programmable electronic device with said configuration file;

permitting a substantial amount of regular gaming machine operations only after confirming that said configuration file has been successfully compared to said custodial file; and facilitating communication between said memory device and said central processing unit upon said confirming that said configuration file has been successfully compared to said custodial file.

2. The method of claim 1, wherein said storing the instructions within a read only configuration file included within a configurator comprises storing the instructions within a read only configuration file included within the configurator that comprises a memory unit.

3. The method of claim 2, wherein said storing the instructions within a read only configuration file included within a configurator comprises storing the instructions within a read only configuration file included within the configurator having a memory unit that comprises a standard Read Only Memory.

4. The method of claim 2, wherein said storing the instructions within a read only configuration file included within a configurator comprises storing the instructions within a read only configuration file included within the configurator having a memory unit that comprises an Electrical Erasable Programmable Read Only Memory.

5. The method of claim 1, wherein said connecting a volatile programmable electronic device comprises connecting a Field Programmable Gate Array in the communication path between the central processing unit and the memory device.

6. The method of claim 1, wherein said connecting a volatile programmable electronic device comprises connecting a Simple Programmable Logic Device or a Complex Programmable Logic Device in the communication path between the central processing unit and the memory device.

7. The method of claim 1, wherein said central processing unit, said volatile programmable electronic device and said configurator all reside within the gaming machine.

8. The method of claim 1, wherein said comparing at least a representative portion is performed by said central processing unit.

9. The method of claim 8, wherein said custodial file is located within said central processing unit.

10. The method of claim 1, wherein said confirming step is performed prior to said transferring step.

11. The method of claim 1, wherein said configurator is located within said central processing unit.

12. The method of claim 1, further comprising determining not to facilitate communication between said memory device and said central processing unit upon determining that said configuration file has been unsuccessfully compared to said custodial file.

13. The method of claim 1, further comprising taking said volatile programmable electronic device out of the reset mode upon said confirming that said configuration file is successfully compared to said custodial file.

14. A microprocessor based gaming machine, comprising:
a central processing unit designed or configured to execute executable programming instructions used to generate a wager-based game on the microprocessor based gaming machine;
at least one of an input device and an output device;
a memory device used in conjunction with the microprocessor based gaming machine, said memory device configured to store the executable programming instructions for generating the wager-based game;
a volatile programmable electronic device, said volatile programmable electronic device comprising a plurality of logic elements programmable to form logic gates, said volatile programmable volatile programmable electronic device disposed in a communication path between the central processing unit and the memory device, said volatile programmable electronic device configured to monitor a communication between the central processing unit and said at least one of said input device and said output device, wherein said central processing unit is configured to determine whether to hold said volatile programmable electronic device in a reset mode;
a configurator;
a read only configuration file located within said configurator and adapted to be used in configuring said volatile programmable electronic device, said read only configuration file comprising instructions for configuring the volatile programmable electronic device to enable communications between the central processing unit and the memory device;
a separate custodial file located within the microprocessor based gaming machine and separate from said configurator, wherein at least a substantial portion of said separate custodial file is identical to at least a substantial portion of said configuration file; and
a comparator designed to compare at least a representative portion of data from said configuration file with at least a representative portion of data from said custodial file to authenticate said configuration file, said comparator adapted to provide a signal to said central processing unit regarding the results of said comparison, said central processing unit configured to continue to determine whether to hold said volatile programmable electronic device in the reset mode until the authentication is completed, said volatile programmable electronic device configured to facilitate communication between said memory device and said central processing unit based on the results of said comparison.

15. The microprocessor based gaming machine of claim 14, wherein said volatile programmable electronic device comprises a Field Programmable Gate Array.

16. The microprocessor based gaming machine of claim 14, wherein said configurator comprises an Electrical Erasable Programmable Read Only Memory.

17. The microprocessor based gaming machine of claim 14, wherein said comparator is located within said central processing unit.

18. The microprocessor based gaming machine of claim 14, wherein said custodial file is located within said central processing unit.

19. The microprocessor based gaming machine of claim 14, wherein said configurator is located within said central processing unit.

20. The microprocessor based gaming machine of claim 14, wherein said input device comprises a coin in switch or an input switch, and said output device comprises a video display or a speaker.

21. The microprocessor based gaming machine of claim 14, wherein said central processing unit is configured to take said volatile programmable electronic device out of the reset mode upon determining that the authentication including a successful comparison of said configuration file to said custodial file is completed.

22. A method of authenticating configuration data in a microprocessor based machine during a machine boot process, comprising:
configuring a central processing unit to execute executable programming instructions for generating a wager-based game on the microprocessor based machine;
storing the executable programming instructions in a memory device to generate the wager-based game;
determining whether to hold said primary volatile programmable electronic device in a reset mode;
holding a plurality of operating contents of a primary volatile programmable electronic device associated with the microprocessor based machine as substantially empty upon a shut down phase of the microprocessor based machine, wherein said holding the operating contents comprises holding the operating contents of the primary volatile programmable electronic device including a plurality of logic elements programmable to form logic gates;
disposing the primary volatile programmable electronic device in a communication path between the central processing unit and the memory device;
monitoring a communication between the central processing unit and at least one of an input device and an output device by using the primary volatile programmable electronic device;
disabling communication between the central processing unit and the memory device by performing said holding of the operating contents of the primary volatile programmable electronic device;
booting up the microprocessor based machine after said shut down phase;
transferring a read only configuration file to said volatile programmable electronic device, said read only configuration file comprising instructions for configuring the volatile programmable electronic device to enable communications between the central processing unit and the memory device;
comparing at least a representative portion of data from said configuration file with at least a representative portion of data from a separate custodial file,
wherein at least a substantial portion of said separate custodial file is identical to at least a substantial portion of said configuration file,
and wherein said separate custodial file resides in a location separate from said memory device;
confirming whether said configuration file has been successfully compared to said custodial file;
determining to continue said holding of said volatile programmable electronic device in the reset mode until said confirming of said successful comparison is completed;
configuring said volatile programmable electronic device with said configuration file;
permitting a substantial amount of regular microprocessor based machine operations only after said confirming that said configuration file has been successfully compared to said custodial file; and
facilitating communication between said memory device and said central processing unit upon said confirming that said configuration file has been successfully compared to said custodial file.

23. The method of claim 22, further comprising taking said volatile programmable electronic device out of the reset mode upon said confirming that said configuration file is successfully compared to said custodial file.

24. A method of authenticating data in a microprocessor based machine, comprising:
configuring a central processing unit (CPU) within the microprocessor based machine to execute executable programming instructions for generating a wager-based game on the microprocessor based machine;
storing the executable programming instructions in a memory device within the microprocessor based machine to generate the wager-based game;
disposing a field programmable gate array (FPGA) in a communication path between the CPU and the memory device, said FPGA located within the microprocessor based machine, and said FPGA comprising a plurality of logic elements programmable to form logic gates;
monitoring a communication between the CPU and at least one of an input device and an output device by using the FPGA;
storing a configuration file within a configurating EEPROM located within the microprocessor based machine, said configuration file comprising instructions for configuring the FPGA to enable communications between the CPU and the memory device;
storing a separate custodial file within the microprocessor based machine and separate from said EEPROM, wherein at least a substantial portion of said separate custodial file is identical to at least a substantial portion of said configuration file;
determining whether to hold said FPGA in a reset mode;
holding a plurality of operating contents of said FPGA as substantially empty upon a shut down phase of the microprocessor based machine to disable communication between the CPU and the memory device;
booting up the microprocessor based machine;
initiating a request to transfer said configuration file from said EEPROM to said FPGA;
utilizing said CPU to compare at least a representative portion of data from said configuration file with at least a representative portion of data from a separate custodial file;
confirming whether said configuration file has been successfully compared to said custodial file satisfaction;
determining to continue said holding of said FPGA in the reset mode until said confirming of said successful comparison is completed;
configuring said FPGA with said configuration file; and
facilitating communication between said memory device and said CPU upon said confirming that said configuration file has been successfully compared to said custodial file.

25. The method of claim 24, further comprising taking said FPGA out of the reset mode upon said confirming that said configuration file is successfully compared to said custodial file.

* * * * *